(12) United States Patent
Zhang et al.

(10) Patent No.: US 12,156,028 B2
(45) Date of Patent: Nov. 26, 2024

(54) WIRELESS NETWORK SWITCHING METHOD AND DEVICE

(71) Applicant: CHINA IWNCOMM CO., LTD., Xi'an (CN)

(72) Inventors: Bianling Zhang, Xi'an (CN); Xiaolong Lai, Xi'an (CN); Manxia Tie, Xi'an (CN); Yuehui Wang, Xi'an (CN); Xiaorong Zhao, Xi'an (CN); Qin Li, Xi'an (CN); Guoqiang Zhang, Xi'an (CN); Zhiqiang Du, Xi'an (CN)

(73) Assignee: CHINA IWNCOMM CO., LTD., Xi'an (CN)

( * ) Notice: Subject to any disclaimer, the term of this patent is extended or adjusted under 35 U.S.C. 154(b) by 370 days.

(21) Appl. No.: 17/781,577

(22) PCT Filed: Nov. 2, 2020

(86) PCT No.: PCT/CN2020/125794
§ 371 (c)(1),
(2) Date: Jun. 1, 2022

(87) PCT Pub. No.: WO2021/109770
PCT Pub. Date: Jun. 10, 2021

(65) Prior Publication Data
US 2022/0417750 A1    Dec. 29, 2022

(30) Foreign Application Priority Data
Dec. 2, 2019  (CN) .......................... 201911215099.6

(51) Int. Cl.
*H04W 12/08*    (2021.01)
*H04W 12/041*   (2021.01)
*H04W 12/106*   (2021.01)

(52) U.S. Cl.
CPC ......... *H04W 12/08* (2013.01); *H04W 12/041* (2021.01); *H04W 12/106* (2021.01)

(58) Field of Classification Search
CPC ............. H04W 12/04; H04W 36/0038; H04W 12/041; H04W 12/069; H04W 12/08;
(Continued)

(56) References Cited

U.S. PATENT DOCUMENTS

| | | | |
|---|---|---|---|
| 7,764,650 B2* | 7/2010 | Sood | H04W 36/0016 455/432.1 |
| 8,504,836 B2 | 8/2013 | Zhang | |

(Continued)

FOREIGN PATENT DOCUMENTS

| | | |
|---|---|---|
| CN | 102026190 A | 4/2011 |
| CN | 102265551 A | 11/2011 |

(Continued)

OTHER PUBLICATIONS

Shruti et al., "Secure 3GPP-WLAN Authentication Protocol Based on EAP-AKA", IEEE Xplore, Jan. 7, 2015 (Jan. 7, 2015), entire document.

(Continued)

*Primary Examiner* — Olumide Ajibade Akonai
(74) *Attorney, Agent, or Firm* — Finch & Maloney PLLC

(57) ABSTRACT

A wireless network switching method. In the method, a station and a target access device directly generate a message integrity check key by means of a domain key, and verify an integrity code on the basis of the message integrity check key, so as to realize the authentication of two parties; and when the authentication of the opposite party is successful, session keys are generated by means of the domain key and in conjunction with random numbers of the two parties, thereby simplifying a switching process and realizing secure and efficient network switching. Further disclosed (Continued)

are a corresponding station and a corresponding access device.

20 Claims, 8 Drawing Sheets

(58) Field of Classification Search
CPC ... H04W 12/106; H04W 84/12; H04W 36/14; H04W 12/06; H04W 12/30; H04W 12/63
See application file for complete search history.

(56) References Cited

U.S. PATENT DOCUMENTS

| | | | | |
|---|---|---|---|---|
| 2006/0083200 | A1* | 4/2006 | Emeott | H04W 12/0433 |
| | | | | 713/168 |
| 2010/0169646 | A1 | 7/2010 | Zhang | |
| 2010/0172500 | A1 | 7/2010 | Wu | |
| 2016/0127903 | A1* | 5/2016 | Lee | H04W 12/06 |
| | | | | 713/168 |
| 2017/0265069 | A1* | 9/2017 | Palanigounder | H04W 12/041 |
| 2019/0149990 | A1* | 5/2019 | Wang | H04W 12/0471 |
| | | | | 370/329 |
| 2020/0328902 | A1* | 10/2020 | Wang | H04L 63/0428 |
| 2021/0226781 | A1* | 7/2021 | Arkko | H04L 9/085 |

FOREIGN PATENT DOCUMENTS

| | | |
|---|---|---|
| CN | 108616354 A | 10/2018 |
| EP | 2205014 A2 | 7/2010 |

OTHER PUBLICATIONS

International Search Report in the international application No. PCT/CN2020/125794, mailed on Jan. 28, 2021.
English translation of the Written Opinion of the International Search Authority in the international application PCT/CN2020/125794, mailed on Jan. 28, 2021.
Ieee: "IEEE Std 802.11r & trade;—2008 IEEE Standard for Information technology& mdash; Telecommunications and information exchange between systems& mdash; Local and metropolitan area networks& mdash; Specific requirements Part 11: Wireless LAN Medium Access Control (MAC) and Physical Layer (PHY) Specification", Jul. 15, 2008 (Jul. 15, 2008), XP055238165, Retrieved from the Internet: URL: http://ieeexplore. ieee. org/stampPDF/getPDF.isp? tp=& arnumber=4573292.
Supplementary European Search Report in the European application No. 20896683.8, mailed on Dec. 6, 2022.

* cited by examiner

WIRELESS NETWORK SWITCHING METHOD AND DEVICE

CROSS-REFERENCE TO RELATED APPLICATION

The present application claims priority to Chinese Patent Application No. 201911215099.6 filed before the State Intellectual Property Office of China on Dec. 2, 2019, and entitled "WIRELESS NETWORK SWITCHING METHOD AND DEVICE", the content of which is hereby incorporated by reference in its entirety.

TECHNICAL FIELD

The present disclosure relates to the communications field, and in particular, to a method for wireless network transition, a requesting device, and an access device.

BACKGROUND

With the development of portable mobile terminal devices such as mobile phones and tablets, wireless communication technology has gradually become one of the mainstream communication technologies. In a wireless communication network, the coverage area of a wireless access device is limited, and therefore, transition of the wireless access device often occurs during the moving process, and the delay generated during the transition process directly affects the communication experience.

When a mobile terminal device accesses a wireless communication network for the first time, it needs to perform a complete initial authentication process with a wireless access device, which process may be referred to as initial mobility domain association. A wireless access device first associated with a mobile terminal device is referred to as an initial access device, and the mobile terminal device may be referred to as a requesting device. During the initial mobility domain association process, the requesting device and the initial access device perform authentication and key negotiation. When the requesting device transitions from the currently associated wireless access device to the new wireless access device during the moving process, a transition process needs to be performed, and the new wireless access device is the target access device.

Based on this, a fast transition mechanism is provided in 802.11 series of specifications of the Institute of Electrical and Electronic Engineers (IEEE). On the premise that the fast transition mechanism is enabled, the mechanism adopts a hierarchical key scheme. Specifically, the authentication is performed between the requesting device (Station, STA) and the Authentication Authorization Accounting server (AAA Server), a main key is generated, and the main key is sent to an Access Point (AP), and then a hierarchical derivation is performed.

Specifically, the level-0, level-1 and level-2 keys are derived during initial authentication, and when the network transition occurs, the level-1 and level-2 keys are re-derived. Since there may be a plurality of access devices in the network, the level-1 and level-2 keys need to be re-derived for each transition, which makes the network transition process cumbersome and affects the transition efficiency.

SUMMARY

In view of this, the present disclosure provides a method for wireless network transition, in which a requesting device and a target access device verify an integrity code based on a message integrity check key derived from a domain key, so as to implement authentication for one another. If the authentication is successful, the requesting device and the target access device directly generate a session key by using the domain key and random numbers of both the requesting device and the target access device, so as to implement secure communication between both the requesting device and the target access device after successful transition without re-deriving the level-1 and level-2 keys, thereby simplifying the transition procedure and improving the transition efficiency. The present disclosure also provides a corresponding requesting device and an access device.

A first aspect of the present disclosure provides a method for wireless network transition, the method including:

receiving from a requesting device, by a target access device, a first random number, an identity of the requesting device, an identity of a domain key selected by the requesting device from a domain key group generated by the requesting device during an initial mobility domain association, and a first integrity code;

obtaining a domain key corresponding to the identity of the selected domain key;

generating a message integrity check key based on the domain key, where the message integrity check key is used for verifying the first integrity code;

in response to that check of the first integrity code is successful, adding, by the target access device, the identity of the requesting device to an association list, generating, by the target access device, a second random number, and generating, by the target access device, a session key based on the domain key, the first random number, and the second random number, where the session key is used for secure communication between the requesting device and the target access device after a transition is successful;

receiving from the target access device, by the requesting device, the second random number, the first random number, an identity of the target access device, and a second integrity code;

in response to that the first random number received by the requesting device is equal to the first random number previously sent by the requesting device, verifying by the requesting device, the second integrity code according to the message integrity check key determined by the requesting device based on the domain key;

generating, by the requesting device, a session key based on the domain key, the first random number, and the second random number in response to that check of the second integrity code is successful;

receiving, by the requesting device, an association status code; and determining, by the requesting device, that the transition is successful, in response to that the association status code identifies that association is successful.

A second aspect of the present disclosure provides a requesting device, the requesting device including:

a sending module, configured to send, to a target access device, a first random number, an identity of the requesting device, an identity of a domain key selected by the requesting device from a domain key group generated by the requesting device during an initial mobility domain association, and a first integrity code;

a receiving module, configured to receive, from the target access device, a second random number, the first random number, an identity of the target access device, a second integrity code, and an association status code, where the second random number is generated by the target access device in response to that the target access device checks the first integrity code successfully;

a verification module, configured to, in response to that the association status code identifies that association is successful, and the first random number received by the requesting device is equal to the first random number previously sent by the requesting device, verify the second integrity code according to the message integrity check key determined by the requesting device based on the domain key; and a generating module, configured to generate a session key based on the domain key, the first random number, and the second random number in response to that check of the second integrity code is successful, so as to realize the network transition.

A third aspect of the present disclosure provides an access device, the access device including:

a receiving module, configured to receive, from a requesting device, a first random number, an identity of the requesting device, an identity of a domain key selected by the requesting device from a domain key group generated by the requesting device during an initial mobility domain association, and a first integrity code;

a generating module, configured to obtain a domain key corresponding to the identity of the selected domain key, and generate a message integrity check key based on the domain key;

a verification module, configured to verify the first integrity code according to the message integrity check key;

where the generating module is further configured to; in response to that check of the first integrity code is successful, add the identity of the requesting device to an association list, generate a second random number, and generate a session key based on the domain key, the first random number, and the second random number, where the session key is used for secure communication between the requesting device and the access device after a transition is successful;

where the access device further includes: a sending module, configured to send, to the requesting device, the second random number, the first random number, an identity of the access device, a second integrity code, and an association status code, where the association status code is used for identifying success or failure of an association of the requesting device.

As can be seen in view of the above technical solution, the present disclosure has the following advantages.

For performing the wireless network transition, the requesting device may select a domain key from the domain key group generated during the initial mobility domain association, directly generate a message integrity check key according to the domain key, and use the message integrity check key to calculate the field being exchanged with the target access device to generate the first integrity code. In this way, when receiving the first random number, the identity of the requesting device, the identity of the selected domain key, and the first integrity code that are sent by the requesting device, the target access device may directly obtain the domain key corresponding to the identity of the domain key, generate the message integrity check key based on the domain key, and check the first integrity code by using the message integrity check key, thereby implementing authentication for the requesting device by the target access device. When the check is successful, the target access device adds the identity of the requesting device to the association list, generates a second random number, and generates a session key based on the domain key and the random numbers of both the target access device and the requesting device, so as to implement secure communication between the requesting device and the target access device after the transition is successful.

Similarly, when the requesting device receives the first random number, the identity of the target access device, and the second integrity code that are sent by the target access device, and the first random number received by the requesting device is equal to the first random number sent by the requesting device, the requesting device verifies the second integrity code by using a message integrity check key generated in the same manner as the target access device, thereby implementing authentication for the target access device by the requesting device. When the check is successful, a session key is generated in the same manner as the target access device. The requesting device receives the association status code identifying that the association is successful, and determines that the transition is successful.

In the above method, the requesting device and the target access device directly generate the message integrity check key by using the domain key, and verify the integrity code based on the message integrity check key, so as to implement entity authentications of both the requesting device and the target access device. When the authentication for one another is successful, the session key is generated by using the domain key combined with the random numbers of both the requesting device and the target access device, which simplifies the transition procedure, and implements a secure and efficient network transition.

BRIEF DESCRIPTION OF THE DRAWINGS

In order to describe more clearly the technical solutions in the embodiments of the present disclosure or the prior art, the drawings required for use in the description of the embodiments or the prior art will be briefly described below. It is apparent that the drawings in the following descriptions are only some embodiments of the disclosure, and those skilled in the art may also obtain other drawings according to these drawings without creative efforts.

DETAILED DESCRIPTION

In a wireless communication network, taking a wireless local area network (WLAN) as an example, an access device (i.e., a wireless access point (AP)) converts a wired electrical signal into a radio signal and transmits the radio signal to form the coverage of the wireless network, and serves as a bridge between the wired network and the wireless network to connect the wireless network to a wired network such as an Ethernet. A requesting device (STA) in the coverage area of the wireless network can be connected to the network through the AP.

In order to expand the coverage area, APs can often be interconnected. As users move, STA often needs to transition between APs and maintain network connectivity. As the delay requirements for transition of the STA between APs become more and more stringent, a fast transition mechanism based on a hierarchical key is proposed in the IEEE802.11 series of specifications. When there is a transition requirement, authentication is performed between the STA and the AAA server to generate a main key, then the AAA server sends the main key to the AP, and then the hierarchical derivation is performed. In each transition process, the level-1 and level-2 keys need to be re-derived, which makes the transition process cumbersome and affects the transition efficiency.

In order to solve the above technical problems, the present disclosure provides a method for wireless network transition. In the method, the STA generates a domain key group when performing an initial mobility domain association, and when the STA is ready to transition from the current AP to the target AP, the STA selects a domain key from the domain key group to generate a message integrity check key. The STA sends an identity of the selected domain key to the target AP, and the target AP obtains the domain key based on the identity, to generate a same message integrity check key based on the domain key. In this way, both the STA and the target AP can use the message integrity check key to check the integrity code, so as to implement authentication for each other. When the check is successful, the STA and the target AP can directly generate a session key according to the domain key and the random numbers of both the STA and the target AP, so as to implement the network transition in the case of confirming that the identity of one another is legal. Since the session key can be directly generated by using the domain key without re-deriving the level-1 and level-2 keys, the number of key derivations in the transition process is reduced, the transition process is simplified, the transition speed is accelerated, and the transition efficiency is improved.

In order to make the technical solutions of the present disclosure clearer and easier to understand, the following is described in detail with reference to specific embodiments.

Figure 1:
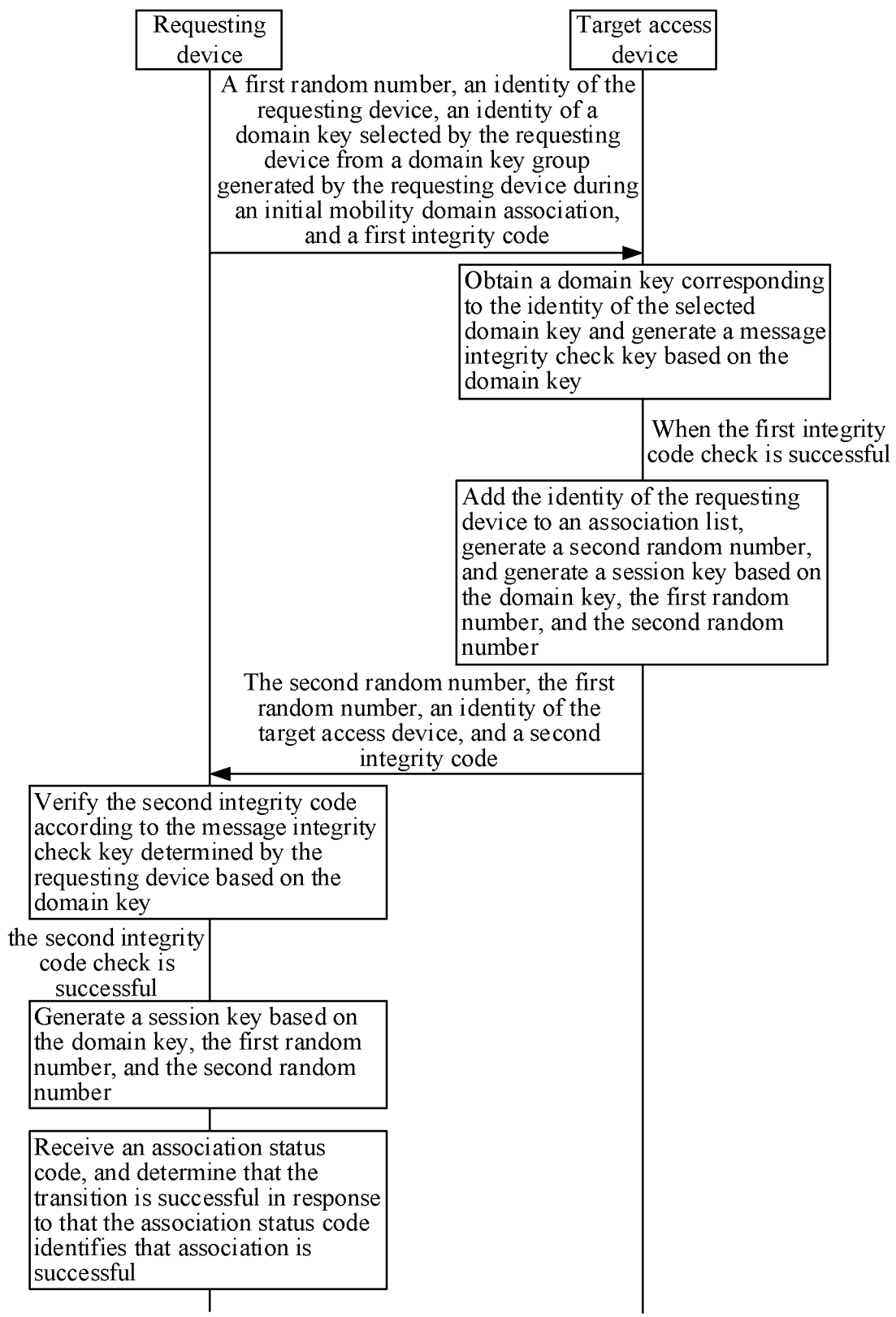
FIG. 1 is a flowchart of a method for wireless network transition according to an embodiment of the present disclosure.

Referring to the flowchart of the method for wireless network transition shown in FIG. 1, the method includes the following operations.

At S101, a target access device receives from a requesting device, a first random number, an identity of the requesting device, an identity of a domain key selected by the requesting device from a domain key group generated by the requesting device during an initial mobility domain association, and a first integrity code; obtains a domain key corresponding to the identity of the selected domain key; and generates a message integrity check key based on the domain key.

The domain key group generated by the requesting device during the initial mobility domain association may be used to implement a wireless network transition. The domain key group may include a plurality of domain keys from which the requesting device may select one domain key to perform the network transition. In consideration of security, the requesting device may select a different domain key for each transition process.

The first integrity code received by the target access device is obtained through calculation of fields by the requesting device, which calculates fields based on the message integrity check key by using the message integrity check algorithm. The fields include the first random number sent by the requesting device, the identity of the requesting device, and the identity of the domain key selected by the requesting device from the domain key group generated by the requesting device during the initial mobility domain association. The target access device may obtain the domain key corresponding to the identity of the selected domain key. The target access device generates the message integrity check key based on the domain key in the same manner as the requesting device generates the message integrity check key. The target access device verifies the first integrity code by using a message integrity check key.

In specific implementation, the target access device may first search for the domain key locally according to the identity of the domain key, and when the local search fails, request for the domain key from the initial access device based on the identity of the initial access device obtained from the requesting device.

In some possible implementations, the target access device may first request for the domain key from the initial access device when the requesting device transitions to the target access device for the first time. When the requesting device transitions to another access device and then transitions back to the target access device from the another access device, the target access device may obtain the domain key locally. Of course, in consideration of security, a limited period for obtaining of the same domain key or a limited number of times for obtaining of the same domain key may be set. For example, the domain key may not be obtained after 5 minutes since being stored locally, or the domain key may not be obtained for more than 3 times after being obtained locally.

In other possible implementations, the target access device may obtain the domain key group when transiting for the first time. As such, in the subsequent transition process, the corresponding domain key may be directly obtained locally, and the network transition is implemented by using the domain key.

When generating the message integrity check key based on the domain key, the requesting device selects the domain key, and the target access device may determine the domain key through the identity of the domain key. The requesting device and the target access device specify the domain key as the base key (BK), use the BK as the protocol key (PK) used in the authentication process, and generate the message integrity check key (i.e., the protocol integrity key) (MTK) based on the PK by using a key derivation algorithm negotiated or preset by the requesting device and the target access device. The key derivation algorithm may be a pseudo-random algorithm, a hash algorithm, or the like. In a specific implementation, the requesting device or the target access device may generate the MTK based on the PK and a selected first character string.

At S102, in response to that the first integrity code check is successful, the target access device adds the identity of the requesting device to an association list, generates a second random number, and generates a session key based on the domain key, the first random number, and the second random number.

In a case that the first integrity code check is successful, it indicates that the authentication for the requesting device is successful by the target access device, and the target access device may add the identity of the requesting device to the association list, so as to implement association between the target access device and the requesting device. The association list may be a storage area in the target access device, and is used for storing the identity of the requesting device that has completed the authentication successfully. The form of the association list is not limited in the present disclosure.

In addition, the target access device further generates a second random number, and the target access device may generate a session key according to the domain key, the first random number, and the second random number, so as to implement secure communication between the requesting device and the target access device after the transition is successful.

Of course, in a case that the verification of the first integrity code fails, it indicates that the authentication for the requesting device is not successful by the target access device, and the target access device may end the current verification process and stop the transition.

At S103, the requesting device receives from the target access device, the second random number, the first random number, an identity of the target access device, a second integrity code, and an association status code; in response to that the first random number received by the requesting device is equal to the first random number previously sent by the requesting device, the requesting device verifies the second integrity code, according to the message integrity check key determined by the requesting device based on the domain key.

Similar to the first integrity code, the second integrity code received by the requesting device is obtained through calculation of fields by the requesting device, which calculates the fields based on the message integrity check key by using the message integrity check algorithm. The fields include the second random number, the first random number, and the identity of the target access device. Therefore, the requesting device may determine the message integrity check key based on the domain key, and use the message integrity check key to verify the second integrity code.

At S104, the requesting device generates a session key based on the domain key, the first random number, and the second random number in response to that check of the second integrity code is successful.

In a case that check of the second integrity code is successful, it indicates that the authentication for the target access device is successful by the requesting device, and the requesting device may generate the session key according to the domain key, the first random number and the second random number in the same calculation manner as the target access device.

At S105, the requesting device receives an association status code; and the requesting device determines that the transition is successful in response to that the association status code identifies that association is successful.

Specifically, after the target access device determines that the authentication for the requesting device is successful and both the requesting device and the target access device generate the session key, the target access device sends an association status code indicating the association success or association failure to the requesting device. The requesting device receives the association status code, and in response to that the association status code field identifies that the association is successful, the requesting device determines that the transition is successful. The requesting device may perform data interaction with the target access device.

It is understood that the method for wireless network transition provided in the present disclosure may be applied to any wireless network, including a cellular network, a wireless local area network, a wireless metropolitan area network, and the like.

It should be noted that the fields for interaction between the target access device and the requesting device, such as the first random number, the identity of the requesting device, the identity of the domain key selected by the requesting device from the domain key group generated by the requesting device during the initial mobility domain association, the first integrity code, or the second random number, the identity of the target access device, the second integrity code, and the association status code, may be carried in a management message for transmitting signaling information. For example, may be carried in a management frame in a wireless local area network, may be carried in a command frame in a personal area network, and may be carried in a signaling frame in a mobile communication network. On the one hand, a management message is an existing message in the network. If these fields for interaction are not carried in the management message, it is necessary to add an additional data-type message to send them separately, which increases the number of message interactions. Therefore, if these fields are carried in the management message, the number of message interactions can be reduced, and the interaction efficiency can be improved. On the other hand, if these fields are carried in the management message, the session key and the message integrity check key can be obtained as soon as possible, and the management message can be protected, thereby improving the security of the management message. If these fields are carried in the data-type message, the time instant at which the above-mentioned key is obtained is delayed, and the management message cannot be protected.

As can be seen from the above, the embodiment of the present disclosure provides a method for wireless network transition, in which the requesting device and the target access device directly generate the message integrity check key by using the domain key, and verify the integrity code based on the message integrity check key, so as to implement authentications of both the requesting device and the target access device. For each of the requesting device and the target access device, when the authentication for one another is successful, it generates the session key by using the domain key combined with the random numbers of both the requesting device and the target access device, which simplifies the transition procedure, and implements a secure and efficient network transition.

For the convenience of understanding, the description is given below by taking WLAN as an example.

The WLAN may include a plurality of APs as access devices, and the requesting device STA may transition from the current AP to the target AP, where the requesting device STA may be a terminal device such as a mobile phone, a Personal Digital Assistant (PDA), a tablet computer, and the like, although the requesting device STA is not limited to the above devices.

A method for wireless network transition according to an embodiment of the present disclosure is described below with reference to FIG. 2. The method includes the following operations.

At S201, an STA sends a fast transition authentication request to a target AP.

The fast transition authentication request includes a mobility domain information element (MDE) field and a first fast transition information element (FTIE) field. The MDE field identifies that a fast transition is supported, and includes a mobility domain identity (MDID) and fast transition capability policy information. The first FTIE field includes a first random number $Nonce_{STA}$ generated by the STA, an identity $ID_{STA}$ of the STA, an identity $Keyname_{STA}$ of the domain key selected by the STA from the domain key group generated by the STA during the initial mobility domain association, and a first integrity code $MacTag_{STA1}$ (MTK).

It should be noted that each AP in the wireless network usually broadcasts its own MDE field periodically. When the STA needs to access the target AP, the STA carries the received MDE field broadcasted by the target AP in the fast transition authentication request.

The $MacTag_{STA1}$ (MTK) is a message integrity check key generated by the STA based on the selected domain key, and is generated by calculating fields other than the $MacTag_{STA1}$ (MTK) in the fast transition authentication request by using a message integrity check algorithm. When the receiver has the selected domain key, the receiver may generate the message integrity check key based on the domain key. The receiver performs local calculation on fields other than the $MacTag_{STA1}$ (MTK) in the fast transition authentication request based on the message integrity check key, and compares the calculation result with the $MacTag_{STA1}$ (MTK), so that the verification of the $MacTag_{STA1}$ (MTK) can be implemented, thereby realizing the authentication for the STA by the target AP.

Based on this, the fast transition authentication request may further carry the identity $ID_{InitAP}$ of the initial access device, so that when the target AP does not find the selected domain key locally, the target AP may request for the domain key from the initial AP according to the $ID_{InitAP}$.

Of course, the first FTIE field may further include a security capability parameter information $Security Capabilities_{STA}$ supported by the STA, so that the target AP can select a security capability parameter to be used accordingly. The $Security Capabilities_{STA}$ may specifically include an authentication suite supported by the STA, a symmetric encryption algorithm, a hash algorithm, a key exchange algorithm and/or a key derivation algorithm, etc. The target AP may select an algorithm for generating a session key based on the above algorithms, such as the first key derivation algorithm, etc.

In some possible implementations, the fast transition authentication request may further include a security information element field for identifying that a security function is supported, through which a security policy can be negotiated. In one example, the security information element field may be a WAPI security information element field, i.e., WAPI[BKID].

At S202, the target AP checks the $MacTag_{STA1}$ (MTK) based on the message integrity check key determined by using the domain key. When the check is successful, the operation S203 is performed.

Specifically, after receiving the $MacTag_{STA1}$ (MTK), the target AP generates the message integrity check key based on the domain key, performs local calculation on fields other than the $MacTag_{STA1}$ (MTK) in the fast transition authentication request based on the message integrity check key, and compares the calculation result with the $MacTag_{STA1}$ (MTK). In response to that the calculation result is equal to the $MacTag_{STA1}$ (MTK), the authentication for the STA is successful, and the subsequent procedure may be performed. In response to that the calculation result is not equal to the $MacTag_{STA1}$ (MTK), the authentication for the STA fails, and the transition procedure may be ended.

At S203, the target AP adds $ID_{STA}$ to the association list, generates a second random number $Nonce_{newAP}$, and generates a session key based on the domain key, the first random number $Nonce_{STA}$, and the second random number $Nonce_{newAP}$.

In a specific implementation, the target AP generates the session key based on the information including the domain key, the $Nonce_{STA}$, and the $Nonce_{newAP}$ by using the first key derivation algorithm determined based on the security capability parameter selected by the target access device, and the session key may be used for secure communication between the requesting device and the target access device after the transition is successful.

Further, the target AP may also add the identities of both the requesting device and the target AP when calculating the session key, so as to increase the complexity of the session key, thereby ensuring security. That is, the target AP calculates the session key by using the first key derivation algorithm according to the information including the domain key, the $Nonce_{STA}$, the $Nonce_{newAP}$, the $ID_{STA}$, and the $ID_{newAP}$.

At S204, the target AP sends a fast transition authentication response to the STA.

The fast transition authentication response includes the MDE field and a second FTIE field, the second FTIE field includes the $Nonce_{newAP}$, $Nonce_{STA}$, $ID_{newAP}$, and a second integrity code $MacTag_{newAP1}$ (MTK).

The $MacTag_{newAP1}$ (MTK) is a message integrity check key generated through calculation, by the target AP, of fields other than the $MacTag_{newAP1}$ (MTK) in the fast transition authentication response by using a message integrity check algorithm based on the domain key.

In some possible implementations, the second FTIE field may further include a $Security Capabilities_{newAP}$ carrying a security capability parameter selected by the target AP, so that the STA determine, according to the $Security Capabilities_{newAP}$, an algorithm used by the target AP for generating the session key, that is, a first key derivation algorithm.

At S205, in response to that the $Nonce_{STA}$ received by the STA is equal to the $Nonce_{STA}$ sent by the STA, the $MacTag_{newAP1}$ (MTK) is checked according to the message integrity check key determined by the STA based on the domain key. In response to that the check is successful, the operation S206 is performed.

Specifically, after receiving the $MacTag_{newAP1}$ (MTK), the STA performs local calculation on fields other than the $MacTag_{newAP1}$ (MTK) in the fast transition authentication response based on the message integrity check key, and compares the calculation result with the $MacTag_{newAP1}$ (MTK), so that the verification of the $MacTag_{newAP1}$ (MTK) can be implemented. In response to that the calculation result is equal to the $MacTag_{newAP1}$ (MTK), the authentication for the target AP is successful, and the subsequent procedure may be performed. In response to that the calculation result is not equal to the MacTag$_{newAP1}$ (MTK), the authentication for the target AP fails, and the transition procedure may be ended.

At S206, The STA generates the session key by using the first key derivation algorithm determined based on the Security Capabilities$_{newAP}$, according to information including the domain key, the Nonce$_{STA}$, and the Nonce$_{newAP}$.

Specifically, the target AP indicates the first key derivation algorithm to be used by the STA through the Security Capabilities$_{newAP}$ carried in the fast transition authentication response. In this way, the STA generates the session key by using the first key derivation algorithm according to the Nonce$_{STA}$ generated by the STA, the received Nonce$_{newAP}$, and the domain key. The generation of the session key means that the authentication is completed and a subsequent transition process can be performed.

In practical application, the session key may be generated by the STA first and then generated by the target AP, or the session key may be generated by the target AP first and then generated by the STA, or the session key may be generated by the STA and the target AP simultaneously. The embodiments of the present disclosure are not limited thereto.

At S207, the STA sends a re-association request to the target AP before the re-association expires.

The re-association deadline is a deadline agreed upon by both the STA and the target AP, and may specifically be a time instant at which a preset association period has lapsed after the fast transition authentication request is sent. For example, if the preset association period is one minute, the re-association deadline may be an end of one minute after the fast transition authentication request is sent.

It is understood that a WLAN may include a plurality of APs belonging to the same basic service set, and when the STA transitions from one AP of the WLAN to a target AP, the process of associating the WLAN with the target AP may be referred to as re-association.

After the authentication is completed, the STA may send a re-association request before deadline of the re-association, that is, before the re-association expires. If the target AP does not receive the re-association request sent by the STA before the re-association expires, the target AP may consider that the STA abandons the re-association with the target AP. In this case, the target AP may delete the session key. When the STA subsequently requests to transition to the target AP again, the above operations S201 to S206 are re-performed to negotiate and generate the session key.

The re-association request includes the MDE field and a third FTIE field, the third FTIE field includes the Nonce$_{STA}$ and a third integrity code MacTag$_{STA2}$ (MTK).

The MacTag$_{STA2}$ (MTK) is generated by the STA by calculating fields other than the MacTag$_{STA2}$ (MTK) in the re-association request by using a message integrity check algorithm based on a message integrity check key.

At S208, the target AP sends a re-association response to the STA.

After receiving the re-association request sent by the requesting device, the target access device needs to check the freshness and integrity of the re-association request, and send a re-association response to the STA after the check is successful.

Specifically, the target AP may verify whether the Nonce$_{STA}$ in the re-association request is equal to the Nonce$_{STA}$ in the fast transition authentication request, and if the Nonce$_{STA}$ in the re-association request is equal to the Nonce$_{STA}$ in the fast transition authentication request, it indicates that the re-association request is fresh, and the target AP may continue to verify the MacTag$_{STA2}$ (MTK). Specifically, the target AP may perform local calculation on fields other than the MacTag$_{STA2}$ (MTK) in the re-association request by using the message integrity check key, and compare the calculation result with the MacTag$_{STA2}$ (MTK), so as to implement check of the MacTag$_{STA2}$ (MTK). If the check is successful, the integrity check of the re-association request is passed. In this case, the target AP may send a re-association response.

The re-association response includes the MDE field, an association status code Status Code field, and a fourth FTIE field. The Status Code field includes an association Status Code, and is specifically used for identifying success or failure of the association, and the fourth FTIE field includes the Nonce$_{newAP}$ and the fourth integrity code MacTag$_{newAP2}$ (MTK).

The MacTag$_{newAP2}$ (MTK) is generated by the target AP by calculating fields other than the MacTag$_{newAP2}$ (MTK) in the re-association response based on the message integrity check key using a message integrity check algorithm.

At S209, in response to that the association status code field identifies that the re-association is successful, the Nonce$_{newAP}$ in the re-association response is equal to the Nonce$_{newAP}$ in the fast transition verification response, and the MacTag$_{newAP2}$ (MTK) check is successful, the STA and the target AP open respective controlled ports.

Specifically, if the re-association response indicates that the re-association is successful, that is, the value of the Status code field is 0, and both the freshness and integrity of the re-association response check is successful, that is, the Nonce$_{newAP}$ consistency verification is successful, and the MacTag$_{newAP2}$ (MTK) check is successful, it indicates that the STA transitions to the target AP. In this case, the STA and the target AP may open respective controlled ports to exchange service data through the controlled ports.

Specifically, the verification of the MacTag$_{newAP2}$ (MTK) may include performing local calculation on fields other than the MacTag$_{newAP2}$ (MTK) in the re-association response by using the message integrity check key, and comparing the calculation result with the MacTag$_{newAP2}$ (MTK), thereby implementing the verification of the MacTag$_{newAP2}$ (MTK).

It should be noted that the order of the fields in each message exchanged between the STA and the target AP is not limited in the present disclosure (the same below).

Considering the security of the data in the interaction process, in the subsequent service data exchange process, the STA and the target AP may encrypt the session data by using the session key obtained through negotiation to generate encrypted session data, transmit the encrypted session data through the controlled port, and the receiver decrypts the encrypted session data by using the session key, so as to implement secure communication between the STA and the target AP.

As can be seen from the above, the embodiment of the present disclosure provides a method for wireless network transition. The STA selects a domain key from a domain key group generated during an initial mobility domain association, generates a message integrity check key based on the domain key, verifies an integrity code by using the message integrity check key, and implements authentication between the STA and a target AP. After the authentication is successful, the STA directly generates a session key by using the domain key, which is used for network security communication after the transition. This method reduces the number of key derivations, simplifies the wireless network transition procedure, and improves the transition efficiency.

Figure 2:
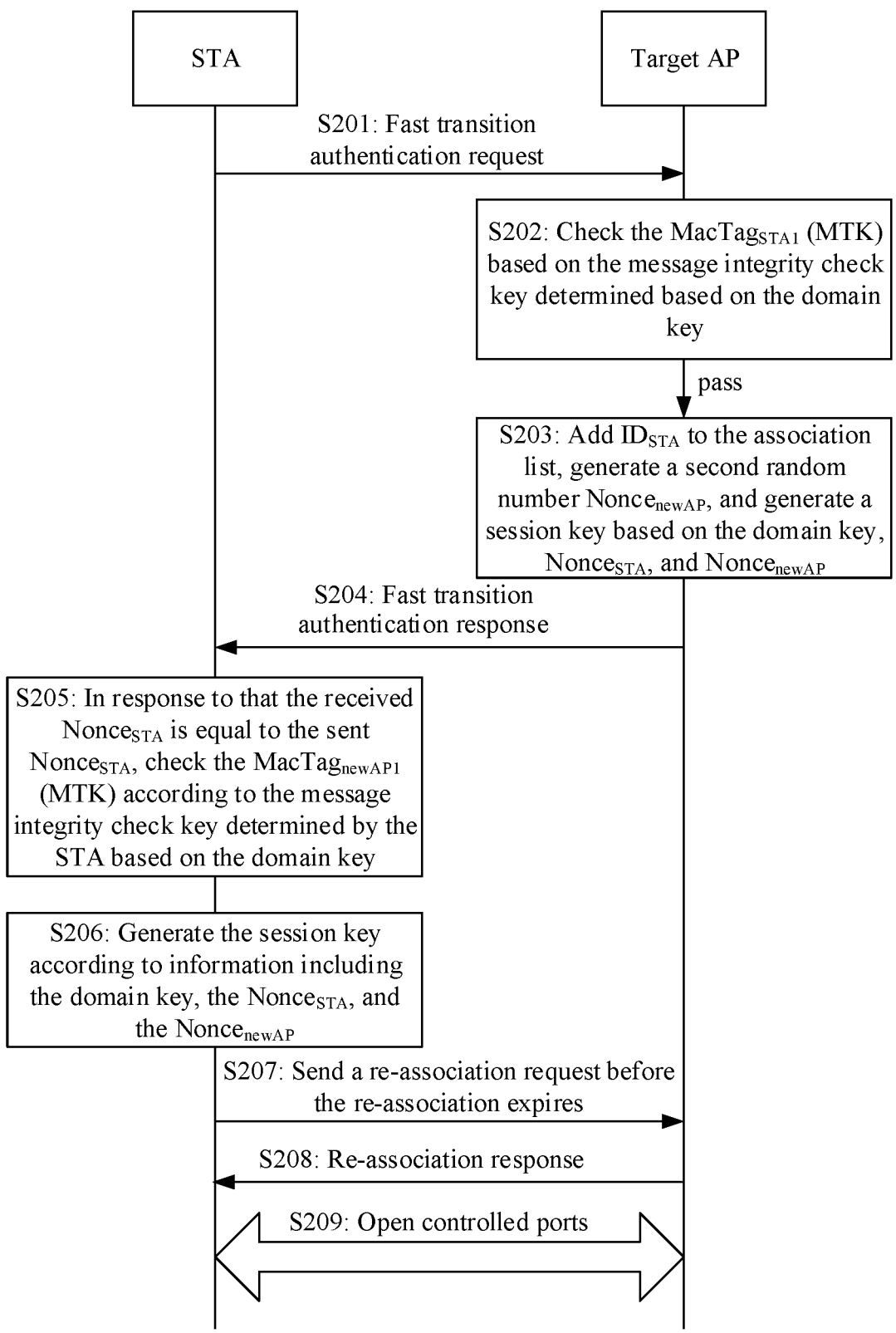
FIG. 2 is a flowchart of a method for wireless network transition in a wireless local area network scenario according to an embodiment of the present disclosure.

In the embodiment shown in FIG. 2, when the STA quickly transitions to the target AP, the session key is quickly generated by using the domain key, and generation of the domain key may be realized by the STA performing initial mobility domain association. The initial mobility domain association process and the process of generating the domain key are described in detail below with reference to specific embodiments.

Figure 3:
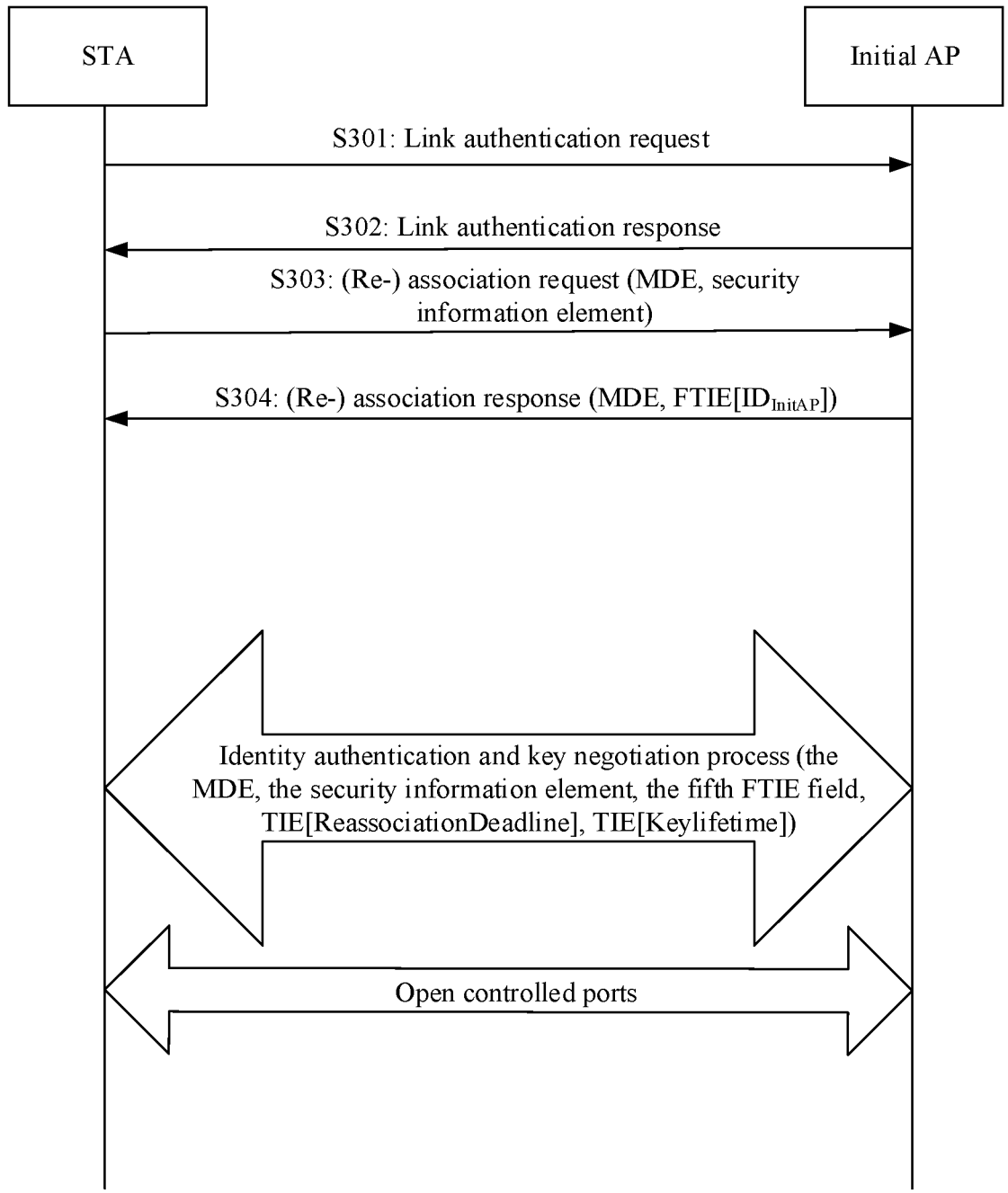
FIG. 3 is a signaling flowchart of an initial mobility domain association according to an embodiment of the present disclosure.

Referring to FIG. 3, the initial mobility domain association process between the STA and the initial access device is as follows.

At S301, an STA sends a link authentication request to an initial access device (i.e., an initial AP).

A field needs to be carried may be added to the link authentication request according to an actual requirement.

At S302, the initial AP sends a link authentication response to the STA.

A field needs to be carried may also be added to the link authentication response according to an actual requirement.

Specifically, the link authentication response may carry a link status field. If the link status field indicates that the link verification is successful, the STA sends an association request to the initial AP to request for association with the initial AP. The association request includes the MDE field and the security information element field, and the content of the MDE field is the same as the content of the MDE field of the initial AP.

At S303, the initial AP receives an association request.

Specifically, after receiving the association request, the initial AP first verifies the content of the MDE field. If the content of the MDE field matches the content of the MDE field of the initial AP, the initial AP allows the STA to perform the association; otherwise, the initial AP rejects the association. It should be noted that in some cases, if the association request includes the MDE field, but the security information element does not specify the fast transition authentication and the key management suite, the initial AP may reject the association. The fast transition authentication and the key management suite identify that a fast transition initial mobility domain association needs to be performed.

At S304: the initial AP generates an association response according to the association result for the STA, and returns the association response to the STA.

Specifically, the initial AP packs the MDE field, the association status code field, and a fifth FTIE field to generate the association response, where the fifth FTIE field includes an identity $ID_{InitAP}$ of the initial AP. As such, the STA may not only obtain a result of the association with the initial AP, but also obtain the identity $M_{InitAP}$ of the initial AP, so that the domain key or the like can be requested from the initial AP according to the $ID_{InitAP}$ during a subsequent AP transition.

As shown in FIG. 3, if the result of the association indicates that the association is successful, the STA and the initial AP perform an initial authentication operation. The initial authentication operation is specifically implemented based on authentication message interaction. The authentication message may specifically include the MDE, the security information element, the fifth FTIE field, and a TIE field. The TIE field specifically includes a re-association deadline TIE[ReassociationDeadline] and a key lifetime TIE[Keylifetime]. The STA and the initial AP generate a domain key group composed of a plurality of domain keys after the authentication is successful. Optionally, the domain key group includes more than one domain keys.

Further, the initial APs may report the domain key group to an area key server (AKS). In order to improve the transition efficiency, the AKS may be allowed to camp in the initial AP, so that the domain key may be directly obtained from the initial AP when obtaining the domain key. In addition, when the other AP (such as the target AP for which the STA requests transition) obtains the domain key, the key may be transmitted through a pre-established secure channel to ensure key security.

It should be noted that, after the initial mobility domain association is successful, the STA and the initial AP may open respective controlled ports, perform secure session and data transmission, and allocate QoS resources.

During the initial mobility domain association process, after the authentication for the STA and the initial AP is successful, the STA and the initial AP may determine a base key. The base key may be a key obtained through Diffie-Hellman (DH) or SM2 exchange. In a shared key mode, the base key may also be a pre-shared key. Then, the STA and the initial AP derive the extended main key (EMK) by using a second key derivation algorithm negotiated between the STA and the initial AP according to the base key, and the STA and the initial AP then generate the domain key group according to the EMK and at least one of: the identities ($ID_{STA}$ and $ID_{InitAP}$) of the STA and the initial AP, or random numbers ($Nonce_{STA}$ and $Nonce_{InitAP}$) generated by the STA and the initial AP.

The embodiments of the present disclosure provide two implementations for the extended main key. The specific implementation of the derivation of the extended main key will be described below.

Figure 4:
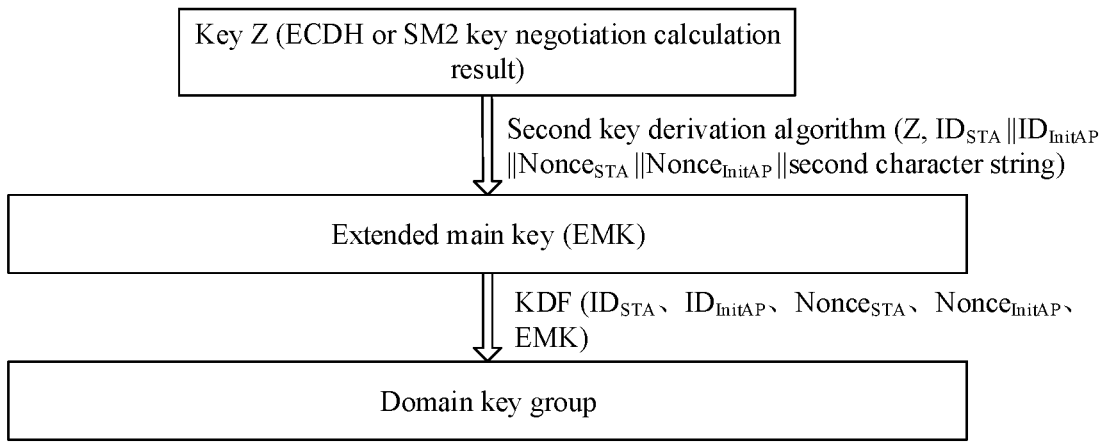
FIG. 4 is a flowchart of a method for deriving a domain key group according to an embodiment of the present disclosure.

An implementation is to derive the extended main key based on an asymmetric key negotiation mechanism. Referring to FIG. 4, the STA and the AP negotiate to obtain a key Z based on a key negotiation algorithm, such as an Elliptic Curve Cryptosystems Diffie-Hellman (ECDH) algorithm or an SM2 algorithm, and then concatenate respective identities of the STA and the AP, respective random numbers generated by the STA and the AP, and a second character string selected by the STA and the AP, and derive the EMK according to the concatenation result and the key Z by using the second key derivation algorithm. The EMK may be specifically represented as a KDF (Z, $ID_{STA}$||$ID_{InitAP}$||$Nonce_{STA}$||$Nonce_{InitAP}$||second character string). The second character string is a fixed character string selected by the STA and the AP as a specific parameter derived by the extended main key, and "||" indicates concatenation.

Figure 5:
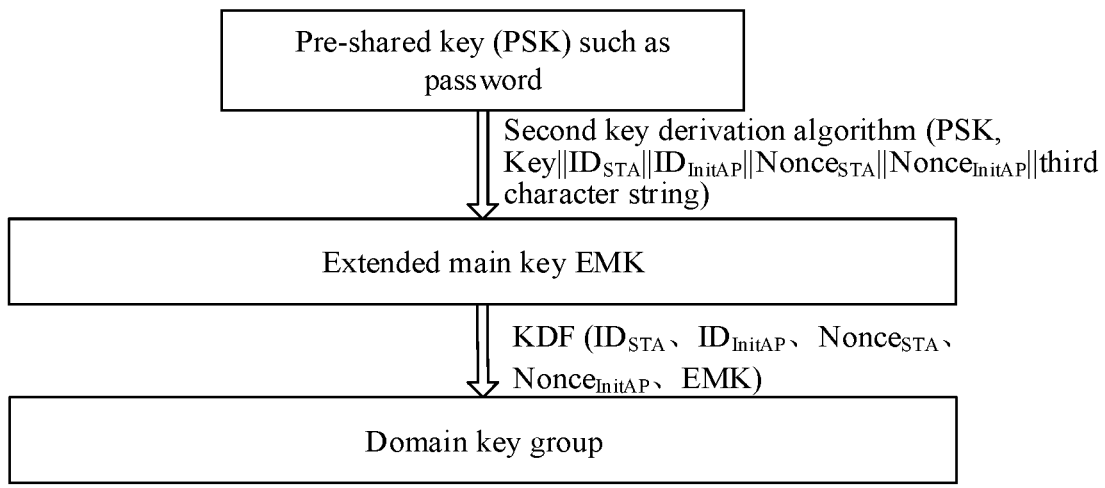
FIG. 5 is a flowchart of another method for deriving a domain key group according to an embodiment of the present disclosure.

In another implementation, the extended main key is derived based on a pre-shared key mechanism. Referring to FIG. 5, the STA and the AP determine a pre-shared key (PSK) in advance. As an example, the PSK may be a password. Then, the STA and the AP may concatenate a key calculated by using the ECDH or SM2 key exchange protocol during the key negotiation process, respective identities of the STA and the AP, respective random numbers generated by the STA and the AP, and a third character string selected by the STA and the AP, and derive the EMK according to the concatenation result and the PSK by using the second key derivation algorithm. The EMK may be specifically represented as a KDF (PSK, Key||$ID_{STA}$||$ID_{InitAP}$||$Nonce_{STA}$||$Nonce_{InitAP}$||third character string). The third character string is a fixed character string selected by the STA and the AP as a specific parameter derived by the extended main key, and "||" indicates concatenation.

In one possible implementation, the process of generating a domain root key(s) (DRK(s)) and the domain key(s) (KEY(s)) based on the extended main key described above is as follows.

DRK=PRF(EMK, $ID_{STA}\|ID_{InitAP}\|Nonce_{STA}\|Nonce_{InitAP}\|$key lable‖fourth character string)

Where Key lable is a printable character string less than 255 bytes, and indicates the usage of the DRK, the Key lable may be in the format of label-string@domain. Each DRK has a different Key lable. The fourth character string is a fixed character string selected by the STA and the AP as a specific parameter derived from the domain root key.

The process of generating the domain key is as follows.

KEY=PRF(DRK, $ID_{STA}\|ID_{InitAP}\|Nonce_{STA}\|Nonce_{InitAP}\|$key lable‖fifth character string)

Where Key lable is a printable character string less than 255 bytes, and indicates the usage of the KEY in the DRK range, Key lable may be in the format of label-string@domain. Each KEY has a different Key lable. The fifth character string is a fixed character string selected by the STA and the AP as a specific parameter derived from the domain key. According to the requirements of the application, a plurality of domain keys may be derived, that is, a domain key group is formed.

Each DRK and each KEY have a uniquely identified name DRKName and

KEYName respectively, and the process of generating the DRKName and KEYName is as follows.

DRKName=KDF (EMKName, key lable|"EMK"|"\0"|length), where EMKName is the corresponding extended main key name;

KEYName=KDF (DRKName, key lable|"EMK"|"\0"|length), where DRKName is the domain root key name derived in the previous operation.

When the STA transitions between APs within a same extended service set (ESS) mobility domain, a fast transition mechanism may be adopted to reduce the transition delay and ensure the continuity of the service data link.

A process in which the STA associates with an AP of a mobility domain for the first time and establishes a connection with the AP is referred to as a fast transition initial mobility domain association. Subsequently, the STA may re-associate with other APs within the same mobility domain by using a fast transition protocol.

For transition from the currently associated AP to the target AP, the STA performs the fast transition protocol. The method for wireless network transition described in the embodiment of FIG. 2 may be specifically implemented in the following two manners according to different transmission modes of the fast transition message.

One mode is an air interface mode Over-the-air, in which the STA directly communicates with the target AP through the link authentication protocol. Another mode is a distributed system mode Over-the-DS, in which the STA communicates with the target AP through the currently associated AP. Specifically, the communication between the STA and the current AP is encapsulated in an action frame. The current AP forward the information to the target AP. The message interaction between the current AP and the target AP may be encapsulated in an Extensible Encapsulation Protocol (EEP) data secure channel.

Figure 6A:
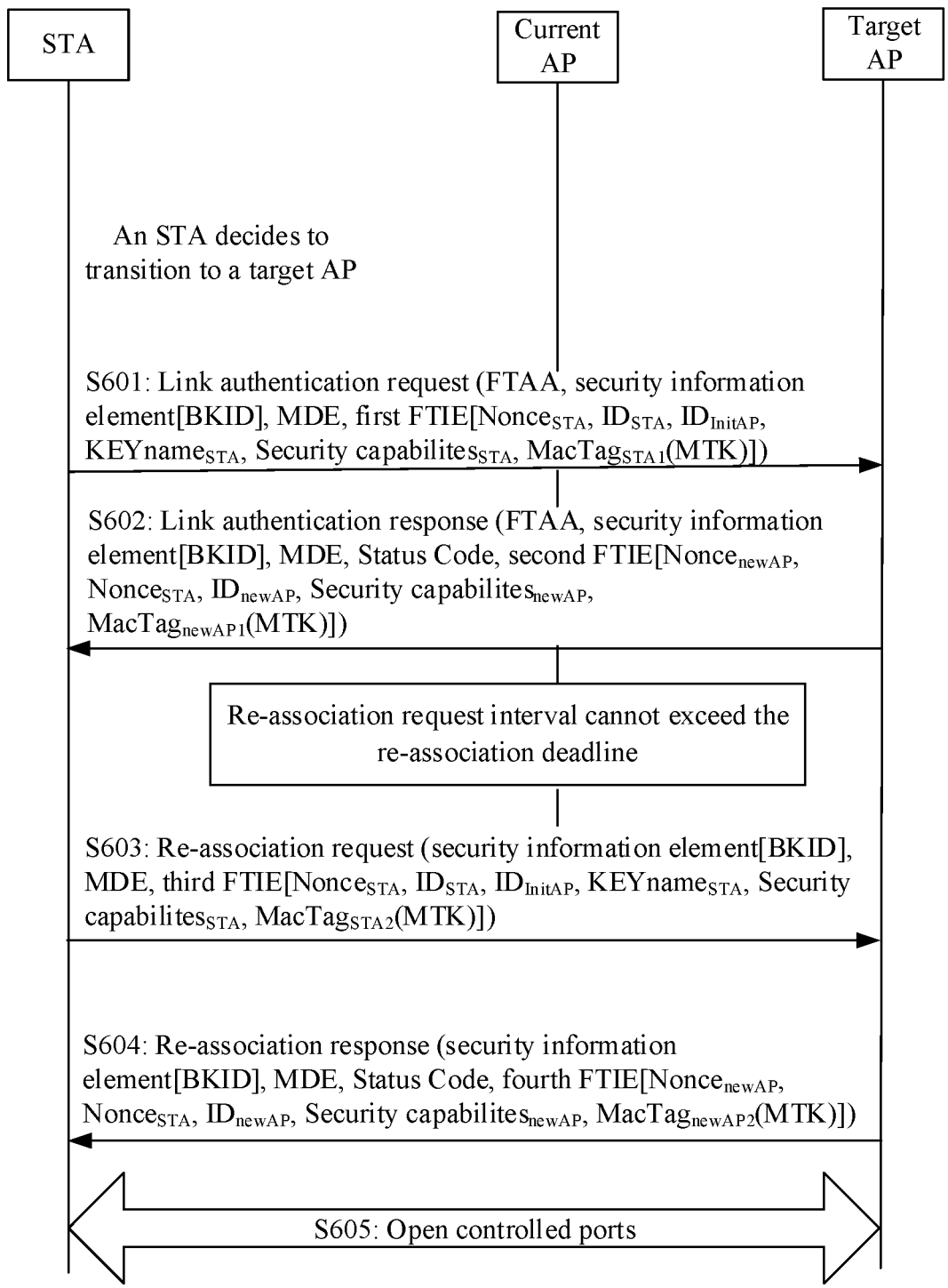
FIG. 6A is a flowchart of a method for wireless network transition in an over-the-air mode of the embodiment of FIG. 2.

For the air interface mode, referring to FIG. 6A, the STA and the target AP adopt the over-the-air fast transition protocol, that is, the over-the-air FT protocol. The STA and the target AP use the FT authentication procedure to negotiate the session key securely based on the domain key by exchanging the $Nonce_{STA}$ and the NonceAP, and negotiate the session key before re-association, thereby protecting the subsequent re-association procedure and the optional resource request procedure.

In a specific implementation, the STA encapsulates the fast transition authentication request in a link authentication request frame according to the link authentication protocol, so as to perform message interaction with the target AP. As shown in FIG. 6A, the STA and the target AP implement the over-the-air fast transition procedure using the following message interaction.

At S601, the STA sends a fast transition authentication request to a target AP, where the fast transition authentication request is encapsulated in a link authentication request frame.

The fast transition authentication request includes an FTAA field, a security information element field [BKID], a MDE field, and a first FTIE field. The first FTIE field includes $Nonce_{STA}$, $ID_{STA}$, $ID_{InitAP}$, $KEYname_{STA}$, Security capabilites$_{STA}$, and a first integrity code $MacTag_{STA1}$ (MTK). The FTAA field is used to identify the link authentication algorithm as a fast transition authentication algorithm.

Since the fast transition authentication request is encapsulated in the link authentication request frame, the frame header of the link authentication request frame needs to carry address information of the target AP, the Source Address (SA) field of the frame header should be set to the MAC address of the STA, and the Destination Address (DA) field of the frame header should be set to the Basic Service Set Identity (BSSID) of the target AP.

For definitions of content of the information element and its subfield in the link authentication request frame, the security-related specification such as ISO/IEC 8802-11 can be referred to.

The $ID_{InitAP}$ is mainly used for the target AP to request for the domain key from the initial AP according to the $ID_{InitAP}$ when the domain key is not found. The target AP searches for the corresponding key by using the value of the KEYname$_{STA}$ and other information in the link authentication request frame. If the target AP does not have a key identified as the KEYname$_{STA}$, the target AP may obtain a domain key corresponding to the key name according to the $ID_{InitAP}$. After receiving the new key of the STA, the target AP shall delete the previous domain key between the target AP and the STA.

The $MacTag_{STA1}$ (MTK) is a message integrity check key MTK generated by the STA based on the selected domain key, and is generated by calculating fields other than the $MacTag_{STA1}$ (MTK) in the fast transition authentication request by using a message integrity check algorithm.

When the target AP receives the fast transition authentication request carrying the $MacTag_{STA1}$ (MTK), the target AP performs local calculation on fields other than the $MacTag_{STA1}$ (MTK) in the fast transition authentication request by using the message integrity check key MTK, and compares the calculation result with the received $MacTag_{STA1}$ (MTK). In response to that the calculation result is equal to the received $MacTag_{STA1}$ (MTK), the check is successful. In this case, the target AP may perform the operations of generating the session key by using the first key derivation algorithm determined based on the security capability parameter selected by the target access device. In response to that the calculation result is not equal to the received $MacTag_{STA1}$ (MTK), the verification fails, and the target AP ends the transition procedure, and may further return prompt information to the STA. The manner for generating the message integrity check key MTK has been described in the embodiment of FIG. 2, and details are not described herein again.

Since the above message integrity check key is generated based on the domain key, only the legal STA can access the target AP. If the STA is not a legal STA, the domain key cannot be obtained, and the message integrity check key cannot be generated according to the domain key. Accordingly, the STA cannot generate a correct first message integrity code $\text{MacTag}_{STA1}$ (MTK). If the $\text{MacTag}_{STA1}$ (MTK) check is successful, it indicates that the STA is a legal STA, and the target AP authenticates the STA successfully. If the $\text{MacTag}_{newAP1}$ (MTK) authentication fails, which indicates that the STA is not a legal STA, the authentication for the STA is failed.

The target AP may generate the session key according to the $\text{Nonce}_{STA}$, the $\text{KEYname}_{STA}$, the $\text{Nonce}_{newAP}$, the identity $\text{ID}_{STA}$ of the requesting device, and the identity $\text{ID}_{newAP}$ of the target access device by using a first key derivation algorithm determined based on the security capability parameter Security capabilites$_{newAP}$ selected by the target access device. Correspondingly, the target AP carries the $\text{ID}_{newAP}$ in the second FTIE field for the STA to calculate the session key according to the information including the $\text{ID}_{newAP}$.

If the content of the MDE received by the target AP does not match the content of the MDE field of the target AP, the target AP rejects the link authentication request. If the first FTIE field contains an invalid $\text{ID}_{InitAP}$, the AP rejects the link authentication request. If the security information element in the link authentication request frame contains an invalid $\text{KEYname}_{STA}$ and the AP has determined that it is an invalid $\text{KEYname}_{STA}$, the AP rejects the authentication request. If the STA selects a unicast cipher suite in the security information element different from the unicast cipher suite used during the initial mobility domain association, the AP rejects the authentication request. After rejecting the authentication request, the STA may retry the link authentication request.

At S602, the target AP sends a fast transition authentication response to the requesting device STA, where the fast transition authentication response includes an FTAA field, a security information element field [BKID], a MDE field, and a second FTIE field, where the second FTIE field includes $\text{Nonce}_{newAP}$, $\text{Nonce}_{STA}$, $\text{ID}_{newAP}$, Security capabilities$_{newAP1}$, and $\text{MacTag}_{newAP1}$ (MTK).

The $\text{Nonce}_{STA}$ is used for consistency verification. Specifically, the STA may compare the received $\text{Nonce}_{STA}$ with the local $\text{Nonce}_{STA}$, and if the received $\text{Nonce}_{STA}$ is equal to the local $\text{Nonce}_{STA}$, the verification is successful, and the STA may perform the operations of generating the session key by using the first key derivation algorithm determined based on the security capability parameter selected by the target AP.

Similar to the fast transition authentication request, the second FTIE field in the fast transition authentication response may further carry a second integrity code $\text{MacTag}_{newAP1}$ (MTK). In this way, the STA may perform the operations of generating the session key by using the first key derivation algorithm determined based on the security capability parameter selected by the target access device, after the check of the $\text{MacTag}_{newAP1}$ (MTK) is successful.

Specifically, the $\text{MacTag}_{newAP1}$ (MTK) is generated by the target AP by calculating fields other than the $\text{MacTag}_{newAP1}$ (MTK) in the fast transition authentication response by using the message integrity check key MTK negotiated between the target AP and the STA. After receiving the fast transition authentication response, the STA performs local calculation on fields other than the $\text{MacTag}_{newAP1}$ (MTK) in the fast transition authentication response by using the message integrity check key, and then compares the $\text{MacTag}_{newAP1}$ (MTK) with the received $\text{MacTag}_{newAP1}$ (MTK). If the calculated $\text{MacTag}_{newAP1}$ (MTK) is equal to the received $\text{MacTag}_{newAP1}$ (MTK), the verification is successful, so as to implement authentication for the target AP by the STA, and allow the STA to perform subsequent operations. If the $\text{MacTag}_{newAP1}$ (MTK) is not equal to the received $\text{MacTag}_{newAP1}$ (MTK), the verification fails, and the current transition process can be ended.

Since the above message integrity check key is generated based on the domain key, only the legal AP can obtain the domain key. If the target AP is not a legal AP, the domain key cannot be obtained, and the message integrity check key cannot be generated, and the second message integrity code $\text{MacTag}_{newAP1}$ (MTK) cannot be generated based on the message integrity check key. In other words, if the $\text{MacTag}_{newAP1}$ (MTK) check is successful, it indicates that the target AP is a legal AP, and the STA authenticates the target AP successfully. If the $\text{MacTag}_{newAP1}$ (MTK) authentication fails, which indicates that the target AP is not a legal AP, the authentication for the target AP is failed.

The target AP indicates the first key derivation algorithm to be used by the STA by carrying the Security Capabilities$_{newAP}$ in the fast transition authentication response, and the STA uses the first key derivation algorithm to generate the session key according to the $\text{Nonce}_{STA}$, the $\text{Nonce}_{newAP}$, and the domain key. The generation of the session key means that the authentication is completed and a subsequent transition process can be performed.

At S603, the STA sends a re-association request to the target AP before the re-association expires.

The re-association request includes a security information element field [BKID], a MDE field, and a third FTIE field. The third FTIE field includes the $\text{Nonce}_{STA}$, $\text{ID}_{STA}$, $\text{ID}_{InitAP}$, $\text{KEYname}_{STA}$, Security capabilites$_{STA}$, and a third integrity code $\text{MacTag}_{STA2}$ (MTK).

The $\text{MacTag}_{STA2}$ (MTK) is generated by the STA by calculating fields other than the $\text{MacTag}_{STA2}$ (MTK) in the re-association request by using a message integrity check algorithm based on a message integrity check key.

At S604, the target AP sends a re-association response to the STA.

After receiving the re-association request sent by the requesting device, the target access device needs to check the freshness and integrity of the re-association request, and send a re-association response to the STA after the check is successful.

Specifically, the target AP may verify whether the $\text{Nonce}_{STA}$ in the re-association request is equal to the $\text{Nonce}_{STA}$ in the fast transition authentication request, and if the $\text{Nonce}_{STA}$ in the re-association request is equal to the $\text{Nonce}_{STA}$ in the fast transition authentication request, it indicates that the re-association request is fresh, and the target AP may continue to verify the $\text{MacTag}_{STA2}$ (MTK). Specifically, the target AP may perform local calculation on fields other than the $\text{MacTag}_{STA2}$ (MTK) in the re-association request by using the message integrity check key, and compare the calculation result with the $\text{MacTag}_{STA2}$ (MTK), so as to implement check of the $\text{MacTag}_{STA2}$ (MTK). If the check is successful, the integrity check of the re-association request is successful. In this case, the target AP may send a re-association response.

The re-association response includes a security information element field [BKID], a MDE field, an association status code Status Code field, and a fourth FTIE field. The Status Code field includes an association Status Code, and is specifically used to identify success or failure of the association. The fourth FTIE field includes $\text{Nonce}_{newAP}$, Non- $ce_{STA}$, $ID_{newAP}$, Security capabilites$_{newAP}$, and the fourth integrity code MacTag$_{newAP2}$ (MTK).

The MacTag$_{newAP2}$ (MTK) is generated by the target AP calculating fields other than the MacTag$_{newAP2}$ (MTK) in the re-association response based on the message integrity check key by using a message integrity check algorithm.

At S605, in response to that the association status code field identifies that the re-association is successful, the Nonce$_{newAP}$ in the re-association response is equal to the Nonce$_{newAP}$ in the fast transition authentication response, and the MacTag$_{newAP2}$ (MTK) check is successful, the STA and the target AP open respective controlled ports.

Specifically, if the re-association response indicates that the re-association is successful, that is, the value of the Status code field is 0 (for example only, it is obvious that success of the re-association can also be represented in other manners), and both the freshness and integrity of the re-association response check is successful, that is, the Nonce$_{newAP}$ consistency verification is successful, and the MacTag$_{newAP2}$ (MTK) check is successful, it indicates that the STA transitions to the target AP. In this case, the STA and the target AP may open respective controlled ports to exchange service data through the controlled ports.

Specifically, the verification of the MacTag$_{newAP2}$ (MTK) may be performed by performing local calculation on fields other than the MacTag$_{newAP2}$ (MTK) in the re-association response by using the message integrity check key, and comparing the calculation result with the MacTag$_{newAP2}$ (MTK), thereby implementing the verification of the MacTag$_{newAP2}$ (MTK).

For the distributed system mode, the STA and the AP interact by using the over-the-DS FT protocol. The STA encapsulates the fields including the first FTIE field in the fast transition authentication request in an action frame, and the STA sends the fast transition authentication request to the target AP in a form of message forwarding by a current AP, and receives the fast transition authentication response sent by the target AP in the form of message forwarding by the current AP.

Figure 6B:
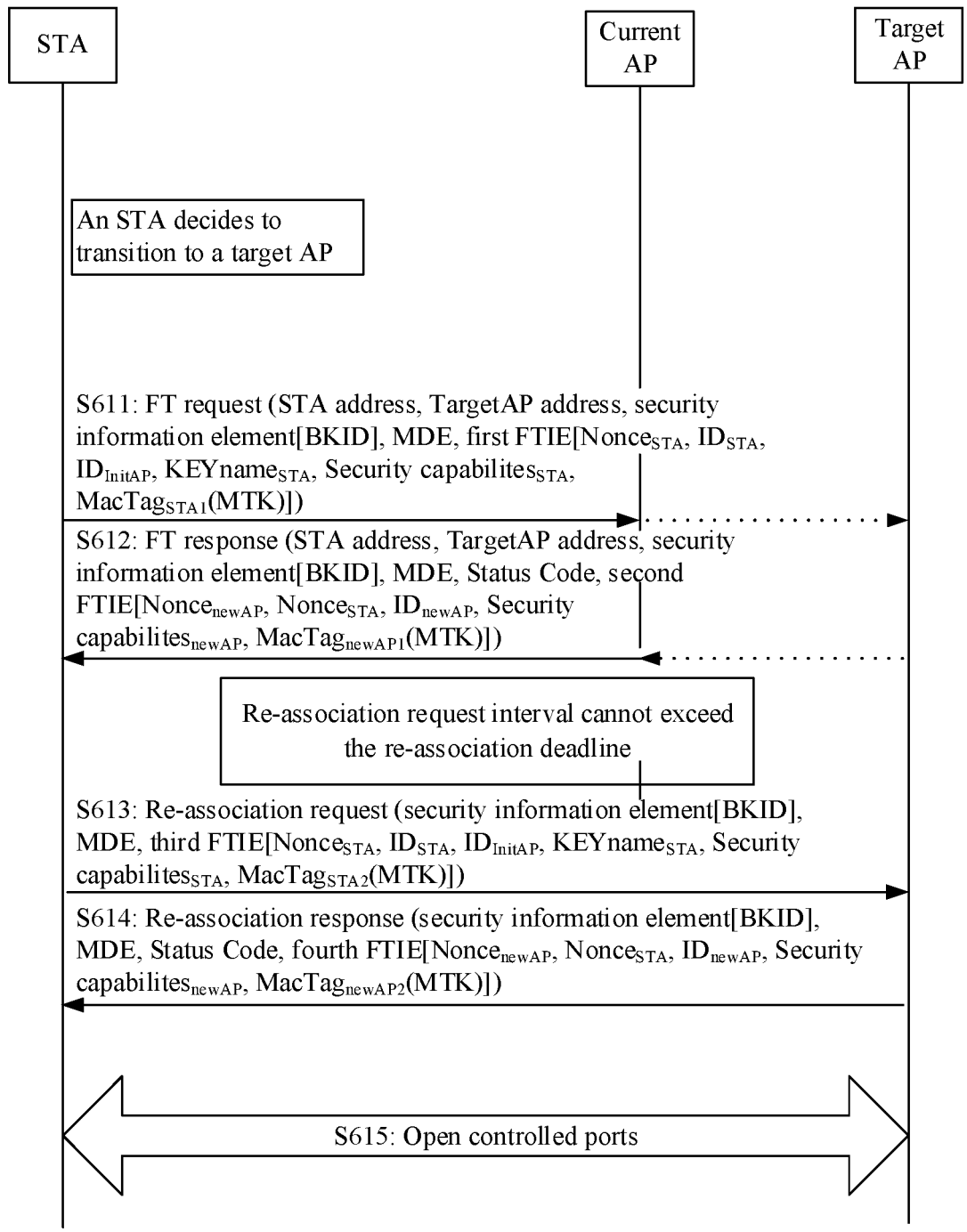
FIG. 6B is a flowchart of a method for wireless network transition in an over-the-DS mode of the embodiment of FIG. 2.

Referring to FIG. 6B, the STA and the AP implement over-the-DS fast transition using the following message interaction.

At S611, an STA sends a fast transition authentication request to a target AP, where the fast transition authentication request is encapsulated in an FT REQUEST frame, and the fast transition authentication request includes an STA address, a TargetAP address, a security information element field [BKID], a MDE field, and a first FTIE field, where the first FTIE field includes Nonce$_{STA}$, $ID_{STA}$, $ID_{InitAP}$, KEYname$_{STA}$, Security capabilites$_{STA}$, and MacTag$_{STA1}$ (MTK).

The STA Address field in the fast transition authentication request is set to the MAC address of the STA, and the Target AP Address field in the fast transition authentication request is set to the BSSID of the target AP.

The MacTag$_{STA1}$ (MTK) is a message integrity check key MTK generated by the STA based on the selected domain key, and is generated by calculating fields other than the MacTag$_{STA1}$ (MTK) in the fast transition authentication request by using a message integrity check algorithm.

When the target AP receives the fast transition authentication request carrying the MacTag$_{STA1}$ (MTK), the target AP performs local calculation on fields other than the MacTag$_{STA1}$ (MTK) in the fast transition authentication request by using the message integrity check key MTK, and compares the calculation result with the received MacTag$_{STA1}$ (MTK). In response to that the calculation result is equal to the received MacTag$_{STA1}$ (MTK), the check is successful. In this case, the target AP may perform the operations of generating the session key by using the first key derivation algorithm determined based on the security capability parameter selected by the target access device. In response to that the calculation result is not equal to the received MacTag$_{STA1}$ (MTK), the verification fails, and the target AP ends the transition procedure, and may further return prompt information to the STA. The mode of generating the message integrity check key MTK has been described in the embodiment with reference to FIG. 2, and details are not described herein again.

Since the above message integrity check key is generated based on the domain key, only the legal STA can access the target AP. If the STA is not a legal STA, the domain key cannot be obtained, and the message integrity check key cannot be generated according to the domain key. Accordingly, the STA cannot generate a correct first message integrity code MacTag$_{STA1}$ (MTK). If the MacTag$_{STA1}$ (MTK) check is successful, it indicates that the STA is a legal STA, and the target AP authenticates the STA successfully. If the MacTag$_{newAP1}$ (MTK) authentication fails, it indicates that the STA is not a legal STA, and the authentication for the STA is failed.

The target AP may generate the session key according to the Nonce$_{STA}$, the KEYname$_{STA}$, the Nonce$_{newAP}$, the identity $ID_{STA}$ of the requesting device, and the identity $ID_{newAP}$ of the target access device by using a first key derivation algorithm determined based on the security capability parameter Security capabilites$_{newAP}$ selected by the target access device. Correspondingly, the target AP carries the $ID_{newAP}$ in the second FTIE field for the STA, to calculate the session key according to the information including the $ID_{newAP}$.

If the content of the MDE received by the target AP does not match the content of the MDE field of the target AP, the target AP rejects the link authentication request. If the first FTIE field contains an invalid $ID_{InitAP}$, the AP rejects the link authentication request. If the security information element in the link authentication request frame contains an invalid KEYname$_{STA}$ and the AP has determined that it is an invalid KEYname$_{STA}$, the AP rejects the authentication request. If the STA selects a unicast cipher suite in the security information element different from the unicast cipher suite used during the initial mobility domain association, the AP rejects the authentication request. After rejecting the authentication request, the STA may retry the link authentication request.

At S612, the target AP sends a fast transition authentication response to the STA, where the fast transition authentication response is encapsulated in an FT RESPONSE frame, and the fast transition authentication response includes an STA address, a TargetAP address, a Status code, a security information element field [BKID], a MDE field, and a second FTIE field, where the second FTIE field includes Nonce$_{newAP}$, Nonce$_{STA}$, $ID_{newAP}$, Security capabilites$_{newAP}$, and MacTag$_{newAP1}$ (MTK).

If the initial AP corresponding to the $ID_{InitAP}$ carried in the fast transition authentication request received by the target AP is unreachable, the target AP sets the Status code to 28 (for example only, it is obvious that the initial AP being unreachable can also be represented in other manners), and the target AP may restrict the STA from re-associating with the target AP.

The STA address field in the fast transition authentication response is set to the MAC address of the STA, and the TargetAP address field in the fast transition authentication response is set to the BSSID of the target AP.

The Nonce$_{STA}$ is configured to perform consistency verification. Specifically, the STA may compare the received Nonce$_{STA}$ with the local Nonce$_{STA}$, and if the received Nonce$_{STA}$ is equal to the local Nonce$_{STA}$, the check is successful, and the STA may perform the operations of generating the session key by using the first key derivation algorithm determined based on the security capability parameter selected by the target access device.

Similar to the fast transition authentication request, the second FTIE field in the fast transition authentication response may further carry a second integrity code MacTag$_{newAP1}$ (MTK). In this way, the STA may perform the operations of generating the session key by using the first key derivation algorithm determined based on the security capability parameter selected by the target access device, after the verification of the MacTag$_{newAP1}$ (MTK) is successful.

Specifically, the MacTag$_{newAP1}$ (MTK) is generated by the target AP by calculating fields other than the MacTag$_{newAP1}$ (MTK) in the fast transition authentication response by using the message integrity check key MTK negotiated between the target AP and the STA. After receiving the fast transition authentication response, the STA uses the message integrity check key to perform local calculation on fields other than the MacTag$_{newAP1}$ (MTK) in the fast transition authentication response, and then compare the MacTag$_{newAP1}$ (MTK) with the received MacTag$_{newAP1}$ (MTK). If the MacTag$_{newAP1}$ (MTK) is equal to the received MacTag$_{newAP1}$ (MTK), the check is successful, so as to implement authentication for the target AP by the STA, and allow the STA to perform subsequent operations. If the MacTag$_{newAP1}$ (MTK) is not equal to the received MacTag$_{newAP1}$ (MTK), the verification fails, and the current transition process can be ended.

Since the above message integrity check key is generated based on the domain key, only the legal AP can obtain the domain key. If the target AP is not a legal AP, the domain key cannot be obtained, and the message integrity check key cannot be generated, and the second message integrity code MacTag$_{newAP1}$ (MTK) cannot be generated based on the message integrity check key. In other words, if the MacTag$_{newAP1}$ (MTK) check is successful, it indicates that the target AP is a legal AP, and the STA authenticates for the target AP successfully. If the MacTag$_{newAP1}$ (MTK) authentication fails, which indicates that the target AP is not a legal AP, the authentication for the target AP is failed.

The target AP indicates the first key derivation algorithm to be used by the STA by carrying the Security Capabilities$_{newAP}$ in the fast transition authentication response, and the STAs use the first key derivation algorithm to generate the session key according to the Nonce$_{STA}$, the Nonce$_{newAP}$, and the domain key. The generation of the session key means that the authentication is completed and a subsequent transition process can be performed.

The fast transition authentication request and the fast transition authentication response are sent between the STA and the current AP through a radio interface and then forwarded to the target AP.

It should be noted that, the frame formats of the above-mentioned FT REQUEST frame and FT RESPONSE frame are not limited in the present embodiment.

It should be noted that, when the Fast BSS Transition over DS included in the MDE field of the target AP is set to 0, the STA cannot start the over-the-DS authentication mode (for example only, it is obvious that the STA cannot starting the over-the-DS authentication mode can also be represented in other manners). In this case, the over-the-air authentication mode can be adopted.

At S613, the STA sends a re-association request to the target AP before the re-association expires.

The re-association request includes a security information element field [BKID], a MDE field, and a third FTIE field. The third FTIE field includes the Nonce$_{STA}$, ID$_{STA}$, ID$_{InitAP}$, KEYname$_{STA}$, Security capabilites$_{STA}$, and a third integrity code MacTag$_{STA2}$ (MTK).

The MacTag$_{STA2}$ (MTK) is generated by the STA by calculating fields other than the MacTag$_{STA2}$ (MTK) in the re-association request by using a message integrity check algorithm based on a message integrity check key.

At S614, the target AP sends a re-association response to the STA.

After receiving the re-association request sent by the requesting device, the target access device needs to check the freshness and integrity of the re-association request, and send a re-association response to the STA after the check is successful.

Specifically, the target AP may verify whether the Nonce$_{STA}$ in the re-association request is equal to the Nonce$_{STA}$ in the fast transition authentication request, and if the Nonce$_{STA}$ in the re-association request is equal to the Nonce$_{STA}$ in the fast transition authentication request, it indicates that the re-association request is fresh, and the target AP may continue to verify the MacTag$_{STA2}$ (MTK). Specifically, the target AP may perform local calculation on fields other than the MacTag$_{STA2}$ (MTK) in the re-association request by using the message integrity check key, and compare the calculation result with the MacTag$_{STA2}$ (MTK), so as to implement check of the MacTag$_{STA2}$ (MTK). If the check is successful, the integrity check of the re-association request is successful. In this case, the target AP may send a re-association response.

The re-association response includes a security information element field [BKID], a MDE field, an association Status Code field, and a fourth FTIE field. The Status Code field includes an association Status Code, and is specifically used to identify success or failure of the association. The fourth FTIE field includes Nonce$_{newAP}$, Nonce$_{STA}$, ID$_{newAP}$, Security capabilites$_{newAP}$, and the fourth integrity code MacTag$_{newAP2}$ (MTK).

The MacTag$_{newAP2}$ (MTK) is generated by the target AP calculating fields other than the MacTag$_{newAP2}$ (MTK) in the re-association response based on the message integrity check key by using a message integrity check algorithm to.

At S615, in response to that the association status code field identifies that the re-association is successful, the Nonce$_{newAP}$ in the re-association response is equal to the Nonce$_{newAP}$ in the fast transition authentication response, and the MacTag$_{newAP2}$ (MTK) check is successful, the STA and the target AP open respective controlled ports.

Specifically, if the re-association response indicates that the re-association is successful, that is, the value of the Status code field is 0 (for example only, it is obvious that the re-association success can also be represented in other manners), and both the freshness and integrity of the re-association response check is successful, that is, the Nonce$_{newAP}$ consistency check is successful, and the MacTag$_{newAP2}$ (MTK) check is successful, it indicates that the STA transitions to the target AP. In this case, the STA and the target AP may open respective controlled ports to exchange service data through the controlled ports.

Specifically, the verification of the MacTag$_{newAP2}$ (MTK) may be performed by performing local calculation on fields other than the MacTag$_{newAP2}$ (MTK) in the re-association response by using the message integrity check key, and comparing the calculation result with the MacTag$_{newAP2}$ (MTK), thereby implementing the verification of the MacTag$_{newAP2}$ (MTK).

The above is the specific implementation of the method for wireless network transition provided in the embodiments of the present disclosure. Based on this, the embodiments of the present disclosure further provide corresponding devices. The above devices provided in the embodiments of the present disclosure will be described below from the perspective of functional modularization.

Figure 7:
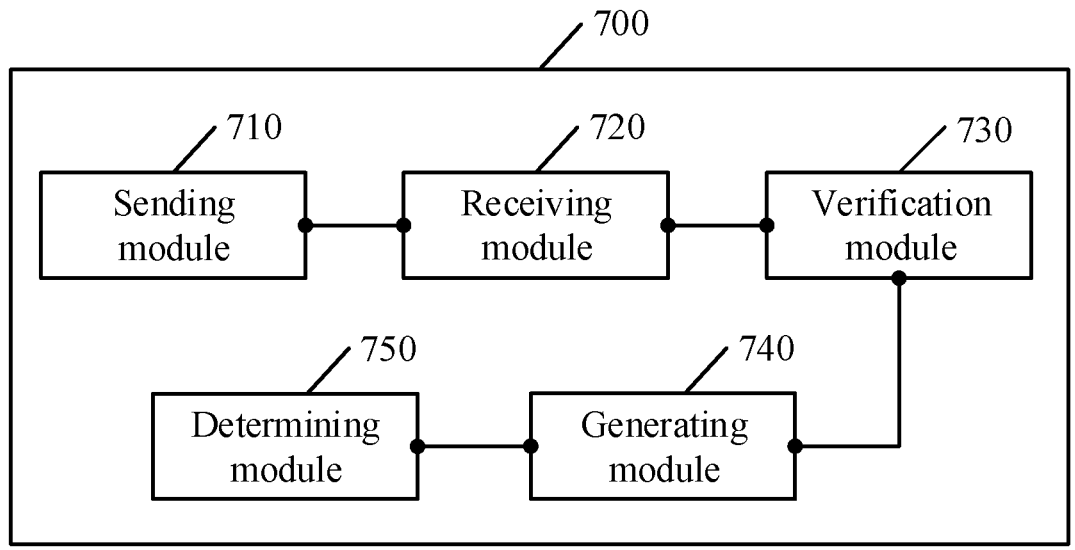
FIG. 7 is a schematic structural diagram of a requesting device according to an embodiment of the present disclosure.
Figure 8:
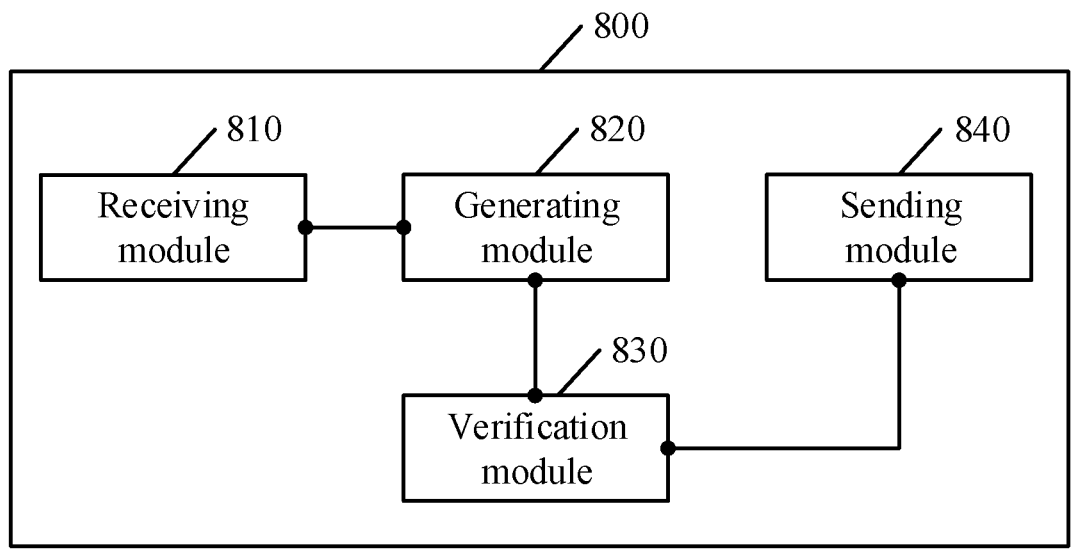
FIG. 8 is a schematic structural diagram of an access device according to an embodiment of the present disclosure.

Referring to the schematic structural diagram of the requesting device shown in FIG. 7, the requesting device 700 includes a sending module 710, a receiving module 720, a verification module 730, a generating module 740 and a determining module 750.

The sending module 710 is configured to send, to a target access device, a first random number, an identity of the requesting device, an identity of a domain key selected by the requesting device from a domain key group generated by the requesting device during an initial mobility domain association, and a first integrity code.

The receiving module 720 is configured to receive, from the target access device, a second random number, the first random number, an identity of the target access device, and a second integrity code, where the second random number is generated by the target access device in response to that the target access device completes the check for the first integrity code successfully.

The verification module 730 is configured to, in response to that the first random number received by the requesting device is equal to the first random number previously sent by the requesting device, check the second integrity code according to the message integrity check key determined by the requesting device based on the domain key.

The generating module 740 is configured to generate a session key based on the domain key, the first random number, and the second random number in response to that the second integrity code check is successful.

The determining module 750 is configured to determine that the transition is successful, in response to receiving an association status code identifying that association is successful sent by the target access device.

Optionally, the domain key group includes more than one domain keys.

Optionally, a field for interaction between the target access device and the requesting device is carried in a management message for transmitting signaling information.

Optionally, the wireless network is a wireless local area network.

The sending module 710 is specifically configured to:

send a fast transition authentication request to the target access device, where the fast transition authentication request includes an MDE field and a first FTIE field, the MDE field identifies that a fast transition is supported, and the first FTIE field includes the first random number generated by the requesting device, the identity of the requesting device, the identity of the domain key selected by the requesting device from the domain key group generated by the requesting device during the initial mobility domain association, and the first integrity code.

The receiving module 720 is specifically configured to:

receive from the target access device, a fast transition authentication response to the requesting device, where the fast transition authentication response includes the MDE field and a second FTIE field, and the second FTIE field includes the second random number, the first random number, the identity of the target access device, and the second integrity code.

The sending module 710 is further configured to:

send a re-association request to the target access device before a re-association expires, where the re-association request includes the MDE field and a third FTIE field, and the third FTIE field includes the first random number and a third integrity code.

The receiving module 720 is further configured to:

receiving a re-association response sent by the target access device, where the re-association response includes the MDE field, an association status code field, and a fourth FTIE field, and the fourth FTIE field includes the second random number and a fourth integrity code.

The requesting device 700 further includes:

a control module, configured to open a controlled port of the requesting device in response to that the association status code field identifies that the re-association is successful, the second random number in the re-association response is equal to the second random number in the fast transition authentication response, and the fourth integrity code check is successful.

Optionally, the second FTIE field further includes the identity of the target access device.

The generating module 740 is specifically configured to:

generate the session key corresponding to the requesting device according to the first random number, the domain key, the second random number, the identity of the requesting device, and the identity of the target access device by using a first key derivation algorithm determined based on a security capability parameter selected by the target access device.

Optionally, the generating module 740 is further configured to encapsulate the fast transition authentication request in a link authentication request frame; or, encapsulate the fast transition authentication request in an action frame;

where in a case that the fast transition authentication request is encapsulated in the action frame, the sending module is further configured to send the fast transition authentication request to the target access device in a form of message forwarding by a current access device, and the receiving module is further configured to receive the fast transition authentication response sent by the target access device in the form of the message forwarding by the current access device, where the fast transition authentication response is encapsulated in the action frame.

Optionally, the generating module 740 is further configured to:

after associating with the initial access device successfully, derive an extended main key by using a second key derivation algorithm, according to a base key determined based on an asymmetric key negotiation mechanism or a pre-shared key mechanism; and generate the domain key group according to the extended main key and at least one of: the identities of the requesting device and the initial access device, or random numbers generated by the requesting device and the initial access device.

Optionally, the sending module 710 is further configured to:

send an association request to an initial access device, where the association request includes an MDE field, of which a content is the same as a content of an MDE field of the initial access device.

The receiving module is further configured to:

receive an association response sent by the initial access device, where the association response includes the MDE field, an association status code field, and a fifth FTIE field, the association status code field is used for identifying success or failure of an association of the requesting device with the initial access device, and the fifth FTIE field includes an identity of the initial access device.

The generating module is further configured to:

in response to that the association status code field identifies that the association is successful, perform an authentication operation by the requesting device and the initial access device, and generate the domain key group after the authentication is successful.

Optionally, the requesting device 700 further includes:

a disassociating module, configured to disassociate the requesting device with the initial access device in response to that the authentication is unsuccessful.

Next, referring to a schematic structural diagram of an access device according to an embodiment of the present disclosure, the access device 800 includes:

a receiving module 810, configured to receive, from a requesting device, a first random number, an identity of the requesting device, an identity of a domain key selected by the requesting device from a domain key group generated by the requesting device during an initial mobility domain association, and a first integrity code;

a generating module 820, configured to obtain a domain key corresponding to the identity of the selected domain key, and generate a message integrity check key based on the domain key; and a verification module 830, configured to verify the first integrity code according to the message integrity check key;

where the generating module 820 is further configured to; in response to that the first integrity code check is successful, add the identity of the requesting device to an association list, generate a second random number, and generate a session key based on the domain key, the first random number, and the second random number, where the session key is used for secure communication between the requesting device and the access device after a transition is successful;

where the access device further includes: a sending module, configured to send, to the requesting device, the second random number, the first random number, an identity of the access device, a second integrity code, and an association status code, where the association status code is used for identifying success or failure of an association of the requesting device.

Optionally, a field for interaction between the access device and the requesting device is carried in a management message for transmitting signaling information.

Optionally, the wireless network is a wireless local area network.

The receiving module 810 is specifically configured to:

receive a fast transition authentication request sent by the requesting device, where the fast transition authentication request includes an MDE field and a first FTIE field, the MDE field identifies that a fast transition is supported, and the first FTIE field includes the first random number generated by the requesting device, the identity of the requesting device, the identity of the domain key selected by the requesting device from the domain key group generated by the requesting device during the initial mobility domain association, and the first integrity code.

The sending module 840 is specifically configured to:

send a fast transition authentication response to the requesting device, where the fast transition authentication response includes the MDE field, an association status code field, and a second FTIE field, and the second FTIE field includes the second random number, the first random number, the identity of the access device, and the second integrity code.

The receiving module 810 is further configured to:

receive a re-association request sent by the requesting device, where the re-association request includes the MDE field and a third FTIE field, and the third FTIE field includes the first random number and a third integrity code.

The verification module 830 is further configured to:

verify whether the first random number in the re-association request is equal to the first random number in the fast transition authentication request; in response to that the first random number in the re-association request is equal to the first random number in the fast transition authentication request, verify the third integrity code by using the message integrity check key.

The sending module 840 is further configured to:

send a re-association response to the requesting device after the check for the third integrity code is successful, where the re-association response includes the MDE field, the association status code field, and a fourth FTIE field including the second random number and a fourth integrity code.

The access device 800 further includes:

a control module, configured to open a controlled port of the access device in response to that the association status code field identifies that the re-association is successful, the second random number in the re-association response is equal to the second random number in the fast transition authentication response, and the fourth integrity code check is successful.

Optionally, the first FTIE field further includes an identity of an initial access device.

The access device 800 further includes:

a searching module, configured to, in response to not finding the domain key, request the domain key from the initial access device according to the identity of the initial access device.

Optionally, the second FTIE field further includes the identity of the access device.

The generating module 820 is specifically configured to:

generate the session key corresponding to the access device according to the first random number, the domain key, the second random number, the identity of the requesting device, and the identity of the access device by using a first key derivation algorithm determined based on a security capability parameter selected by the access device.

Optionally, the access device is an initial access device, and the generating module 820 is further configured to:

derive an extended main key by using a second key derivation algorithm, according to a base key determined based on an asymmetric key negotiation mechanism or a pre-shared key mechanism; and generate, the domain key group according to the extended main key and at least one of: the identities of the requesting device and the initial access device, or random numbers generated by the requesting device and the initial access device.

Optionally, the receiving module 810 is further configured to:

receive, in an initial access phase, an association request sent by the requesting device, where the association request includes an MDE field, of which a content is the same as a content of an MDE field of the initial access device.

The sending module 840 is further configured to:

send an association response to the requesting device, where the association response includes the MDE field, an association status code field, and a fifth FTIE field, the association status code field is used for identifying success or failure of an association of the requesting device with the initial access device, and the fifth FTIE field includes an identity of the initial access device;

The generating module 820 is further configured to:

in response to that the association status code field identifies that the association is successful, perform an authentication operation, and generate the domain key group after the authentication is successful.

It will be clearly understood by those skilled in the art that, for the sake of convenience and brevity of description, the specific operating processes of the above-described systems, devices and units may be referred to the corresponding processes in the foregoing method embodiments, and details are not described herein again.

In several embodiments provided in the present disclosure, it should be understood that the disclosed devices and methods may be implemented in other manners. For example, the device embodiments described above are only illustrative, for example, the division of the modules, which is only a logical function division. In actual implementation, there may be other division manners. For example, multiple modules may be combined or integrated into another system, or some features may be ignored or not performed. In addition, the shown or discussed mutual coupling or direct coupling or communication connection may be an indirect coupling or communication connection through some interfaces, devices or modules, which may be electrical, mechanical or other forms.

The modules described as separate components may or may not be physically separated, and the components displayed as modules may or may not be physical units, that is, may be located in one place, or may be distributed to a plurality of network units. Some or all of the units may be selected according to actual needs to achieve the purpose of the solution in the embodiment.

It should be understood that in the present disclosure, "at least one (item)" refers to one or more, and "a plurality of" refers to two or more. "And/or" is used to describe the relationship between related objects, indicating that three relationships may exist, for example, "A and/or B" may indicate that: only A, only B, and both A and B exist, where A, B may be singular or plural. The character "I" generally indicates that the associated object is an "or" relationship. "At least one (item) below" or its similar expression refers to any combination of these items, including any combination of a single term or a multiple terms. For example, at least one of a, b or c may indicate that: a, b, c, "a and b", "a and c", "b and c", or "a and b and c", where a, b, c can be single or multiple.

As described above, the above embodiments are merely intended to illustrate, but not limit, the technical solution of the present disclosure. Although the disclosure has been described in detail with reference to the foregoing embodiments, it should be understood by those skilled in the art that the technical solutions described in the foregoing embodiments may be modified or some of the technical features thereof may be equally replaced. These modifications or substitutions do not depart from the spirit and scope of the embodiments of the present disclosure.

The invention claimed is:

1. A method for wireless network transition, comprising:

receiving from a requesting device, by a target access device, a first random number, an identity of the requesting device, an identity of a domain key selected by the requesting device from a domain key group generated by the requesting device during an initial mobility domain association, and a first integrity code;

obtaining a domain key corresponding to the identity of the selected domain key;

generating a message integrity check key based on the domain key, wherein the message integrity check key is used for verifying the first integrity code;

in response to that the first integrity code check is successful, adding, by the target access device, the identity of the requesting device to an association list, generating, by the target access device, a second random number, and generating, by the target access device, a session key based on the domain key, the first random number, and the second random number, wherein the session key is used for secure communication between the requesting device and the target access device after a transition is successful;

receiving from the target access device, by the requesting device, the second random number, the first random number, an identity of the target access device, and a second integrity code;

in response to that the first random number received by the requesting device is equal to the first random number previously sent by the requesting device, verifying by the requesting device, the second integrity code according to the message integrity check key determined by the requesting device based on the domain key;

generating, by the requesting device, a session key based on the domain key, the first random number, and the second random number in response to that the second integrity code check is successful;

receiving, by the requesting device, an association status code; and determining, by the requesting device, that the transition is successful, in response to that the association status code identifies that association is successful.

2. The method of claim 1, wherein the domain key group comprises more than one domain keys.

3. The method of claim 1, wherein a field for interaction between the target access device and the requesting device is carried in a management message for transmitting signaling information.

4. The method of claim 1, wherein the wireless network is a wireless local area network, and the method comprises:

sending, by the requesting device, a fast transition authentication request to the target access device, wherein the fast transition authentication request comprises a mobility domain information element (MDE) field and a first fast transition information element (FTIE) field, the MDE field identifies that a fast transition is supported, and the first FTIE field comprises the first random number generated by the requesting device, the identity of the requesting device, the identity of the domain key selected by the requesting device from the domain key group generated by the requesting device during the initial mobility domain association, and the first integrity code;

sending, by the target access device, a fast transition authentication response to the requesting device, wherein the fast transition authentication response comprises the MDE field and a second FTIE field, and the second FTIE field comprises the second random number, the first random number, the identity of the target access device, and the second integrity code;

sending, by the requesting device, a re-association request to the target access device before a re-association expires, wherein the re-association request comprises the MDE field and a third FTIE field, and the third FTIE field comprises the first random number and a third integrity code;

verifying, by the target access device, whether the first random number in the re-association request is equal to the first random number in the fast transition authentication request; in response to that the first random number in the re-association request is equal to the first random number in the fast transition authentication request, verifying the third integrity code by using the message integrity check key; and if the check is successful, sending a re-association response to the requesting device, wherein the re-association response comprises the MDE field, an association status code field, and a fourth FTIE field comprising the second random number and a fourth integrity code; and in response to that the association status code field identifies that the re-association is successful, the second random number in the re-association response is equal to the second random number in the fast transition authentication response, and the fourth integrity code check is successful, opening, by the requesting device and the target access device, respective controlled ports.

5. The method of claim 4, wherein the first FTIE field further comprises an identity of an initial access device; and the method further comprises:

in response to not finding the domain key, requesting, by the target access device, the domain key from the initial access device according to the identity of the initial access device.

6. The method of claim 4, wherein the second FTIE field further comprises the identity of the target access device; and the method further comprises:

generating, by the requesting device and the target access device, respective session keys according to the first random number, the domain key, the second random number, the identity of the requesting device, and the identity of the target access device by using a first key derivation algorithm determined based on a security capability parameter selected by the target access device.

7. The method of claim 4, wherein the fast transition authentication request is encapsulated in a link authentication request frame; or, the fast transition authentication request is encapsulated in an action frame, wherein in a case that the fast transition authentication request is encapsulated in the action frame, sending, by the requesting device, the fast transition authentication request to the target access device comprises:

sending, by the requesting device, the fast transition authentication request to the target access device in a form of message forwarding by a current access device, and receiving, by the requesting device, the fast transition authentication response sent by the target access device in the form of the message forwarding by the current access device, wherein the fast transition authentication response is encapsulated in the action frame.

8. The method of claim 1, further comprising:

after associating with the initial access device successfully, deriving, by the requesting device, an extended main key by using a second key derivation algorithm, according to a base key determined based on an asymmetric key negotiation mechanism or a pre-shared key mechanism; and generating, by the requesting device and the initial access device, the domain key group according to the extended main key and at least one of: the identities of the requesting device and the initial access device, or random numbers generated by the requesting device and the initial access device.

9. The method of claim 1, wherein initial mobility domain association of the requesting device with the initial access device is performed in the following way:

sending, by the requesting device, an association request to an initial access device, wherein the association request comprises an MDE field, of which a content is the same as a content of an MDE field of the initial access device;

sending, by the initial access device, an association response to the requesting device, wherein the association response comprises the MDE field, an association status code field, and a fifth FTIE field, the association status code field is used for identifying success or failure of an association of the requesting device with the initial access device, and the fifth FTIE field comprises an identity of the initial access device; and in response to that the association status code field identifies that the association is successful, performing, by the requesting device and the initial access device, an authentication operation, and generating the domain key group after the authentication is successful.

10. The method of claim 9, further comprising:

in response to that the authentication is unsuccessful, disassociating, by the requesting device, the requesting device with the initial access device.

11. A requesting device, comprising:

a sending module, configured to send, to a target access device, a first random number, an identity of the requesting device, an identity of a domain key selected by the requesting device from a domain key group generated by the requesting device during an initial mobility domain association, and a first integrity code;

a receiving module, configured to receive, from the target access device, a second random number, the first random number, an identity of the target access device, and a second integrity code, wherein the second random number is generated by the target access device in response to that the check the first integrity code is successful;

a verification module, configured to, in response to that the first random number received by the requesting device is equal to the first random number previously sent by the requesting device, verify the second integrity code according to the message integrity check key determined by the requesting device based on the domain key;

a generating module, configured to generate a session key based on the domain key, the first random number, and the second random number in response to that the second integrity code check is successful; and a determining module, configured to determine that the transition is successful, in response to receiving an association status code identifying that association is successful sent by the target access device.

12. The requesting device of claim 11, wherein the domain key group comprises more than one domain keys.

13. The requesting device of claim 11, wherein a field for interaction between the target access device and the requesting device is carried in a management message for transmitting signaling information.

14. The requesting device of claim 11, wherein the wireless network is a wireless local area network;
the sending module is configured to:
send a fast transition authentication request to the target access device, wherein the fast transition authentication request comprises a mobility domain information element (MDE) field and a first fast transition information element (FTIE) field, the MDE field identifies that a fast transition is supported, and the first FTIE field comprises the first random number generated by the requesting device, the identity of the requesting device, the identity of the domain key selected by the requesting device from the domain key group generated by the requesting device during the initial mobility domain association, and the first integrity code;
the receiving module is configured to:
receive from the target access device, a fast transition authentication response to the requesting device, wherein the fast transition authentication response comprises the MDE field and a second FTIE field, and the second FTIE field comprises the second random number, the first random number, the identity of the target access device, and the second integrity code;
the sending module is further configured to:
send a re-association request to the target access device before a re-association expires, wherein the re-association request comprises the MDE field and a third FTIE field, and the third FTIE field comprises the first random number and a third integrity code;
the receiving module is further configured to:
receive a re-association response sent by the target access device, wherein the re-association response comprises the MDE field, an association status code field, and a fourth FTIE field, and the fourth FTIE field comprises the second random number and a fourth integrity code; and
the requesting device further comprises:
a control module, configured to open a controlled port of the requesting device in response to that the association status code field identifies that the re-association is successful, the second random number in the re-association response is equal to the second random number in the fast transition authentication response, and the fourth integrity code check is successful.

15. The requesting device of claim 14, wherein the second FTIE field further comprises the identity of the target access device; and
the generating module is configured to:
generate the session key corresponding to the requesting device according to the first random number, the domain key, the second random number, the identity of the requesting device, and the identity of the target access device by using a first key derivation algorithm determined based on a security capability parameter selected by the target access device.

16. The requesting device of claim 14, wherein the generating module is further configured to encapsulate the fast transition authentication request in a link authentication request frame; or,
encapsulate the fast transition authentication request in an action frame;
wherein in a case that the fast transition authentication request is encapsulated in the action frame, the sending module is further configured to send the fast transition authentication request to the target access device in a form of message forwarding by a current access device, and the receiving module is further configured to receive the fast transition authentication response sent by the target access device in the form of the message forwarding by the current access device, wherein the fast transition authentication response is encapsulated in the action frame.

17. The requesting device of claim 11, wherein the generating module is further configured to:
after associating with the initial access device successfully, derive an extended main key by using a second key derivation algorithm, according to a base key determined based on an asymmetric key negotiation mechanism or a pre-shared key mechanism; and
generate the domain key group according to the extended main key and at least one of: the identities of the requesting device and the initial access device, or random numbers generated by the requesting device and the initial access device.

18. The requesting device of claim 11, wherein the sending module is further configured to:
send an association request to an initial access device, wherein the association request comprises an MDE field, of which a content is the same as a content of an MDE field of the initial access device;
the receiving module is further configured to:
receive an association response sent by the initial access device, wherein the association response comprises the MDE field, an association status code field, and a fifth FTIE field, the association status code field is used for identifying success or failure of an association of the requesting device with the initial access device, and the fifth FTIE field comprises an identity of the initial access device; and
the generating module is further configured to:
in response to that the association status code field identifies that the association is successful, perform an authentication operation, and generate the domain key group after the authentication is successful.

19. The requesting device of claim 18, further comprising:
a disassociating module, configured to disassociate the requesting device with the initial access device in response to that the authentication is unsuccessful.

20. An access device, comprising:
a receiving module, configured to receive, from a requesting device, a first random number, an identity of the requesting device, an identity of a domain key selected by the requesting device from a domain key group generated by the requesting device during an initial mobility domain association, and a first integrity code;
a generating module, configured to obtain a domain key corresponding to the identity of the selected domain key, and generate a message integrity check key based on the domain key; and
a verification module, configured to verify the first integrity code according to the message integrity check key;

wherein the generating module is further configured to: in response to that the first integrity code check is successful, add the identity of the requesting device to an association list, generate a second random number, and generate a session key based on the domain key, the first random number, and the second random number, wherein the session key is used for secure communication between the requesting device and the access device after a transition is successful;

wherein the access device further comprises:

a sending module, configured to send, to the requesting device, the second random number, the first random number, an identity of the access device, a second integrity code, and an association status code, wherein the association status code is used for identifying success or failure of an association of the requesting device.

* * * * *